US011247770B2

(12) United States Patent
Cary et al.

(10) Patent No.: US 11,247,770 B2
(45) Date of Patent: Feb. 15, 2022

(54) VORTEX GENERATOR SYSTEM AND METHOD FOR ASSISTING IN STORE SEPARATION FROM A VEHICLE, AND AIRCRAFT HAVING VORTEX GENERATOR SYSTEM

(71) Applicant: The Boeing Company, Chicago, IL (US)

(72) Inventors: Andrew Wham Cary, St. Charles, MO (US); Rene Woszidlo, St. Charles, MO (US); John Anthony Schaefer, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 16/784,094

(22) Filed: Feb. 6, 2020

(65) Prior Publication Data

US 2021/0245866 A1 Aug. 12, 2021

(51) Int. Cl.
*B64C 21/02* (2006.01)
*B64C 7/00* (2006.01)
*B64D 1/02* (2006.01)

(52) U.S. Cl.
CPC .............. *B64C 21/02* (2013.01); *B64C 7/00* (2013.01); *B64D 1/02* (2013.01)

(58) Field of Classification Search
CPC ........... B64C 21/02; B64C 7/00; B64C 23/06; B64D 1/02
See application file for complete search history.

(56) References Cited

U.S. PATENT DOCUMENTS

| 4,696,442 A * | 9/1987 | Mazzitelli | B64C 23/06 244/53 B |
| 6,098,925 A * | 8/2000 | Burdsall, II | B64C 23/06 244/118.1 |
| 9,638,176 B2 | 5/2017 | Shivashankara | |
| 2004/0129838 A1* | 7/2004 | Lisy | B64C 3/58 244/204.1 |
| 2012/0248072 A1* | 10/2012 | McClure | B64C 23/005 219/121.5 |
| 2020/0369379 A1* | 11/2020 | Konings | B64C 23/06 |

OTHER PUBLICATIONS

Ahmed Omer, "Passive Methods for Suppressing Acoustic Resonance Excitation in Shallow Rectangular Cavities," Thesis— University of Ontario Institute of Technology; pp. 5-6, 18-27, and 37-41; available at <http://hdl.handle.net/10155/452>, published Aug. 2014.

* cited by examiner

*Primary Examiner* — Rodney A Bonnette

(57) ABSTRACT

A vortex generator system has at least two vortex generators protrudable from an outer mold line of a vehicle surface at a location upstream of a cavity leading edge of a cavity in the vehicle surface. The vortex generators are spaced apart from each other and oriented such that the vortex generator aft ends are nearer to each than the vortex generator forward ends. The vortex generator lengthwise direction of each one of the vortex generators is oriented at a vortex generator directional angle relative to a direction of an airflow. The vortex generators are configured to generate a pair of counter-rotating vortices when the airflow passes over through or over the vortex generators. The counter-rotating vortices interact to produce a downwash of air away from the cavity that urges the store away from the vehicle as the store exits the cavity.

20 Claims, 17 Drawing Sheets

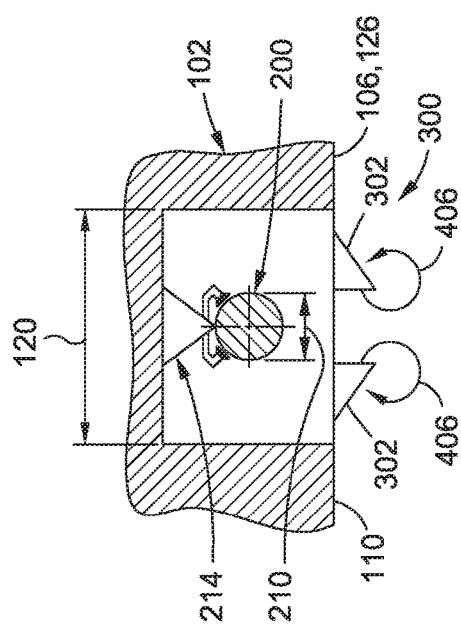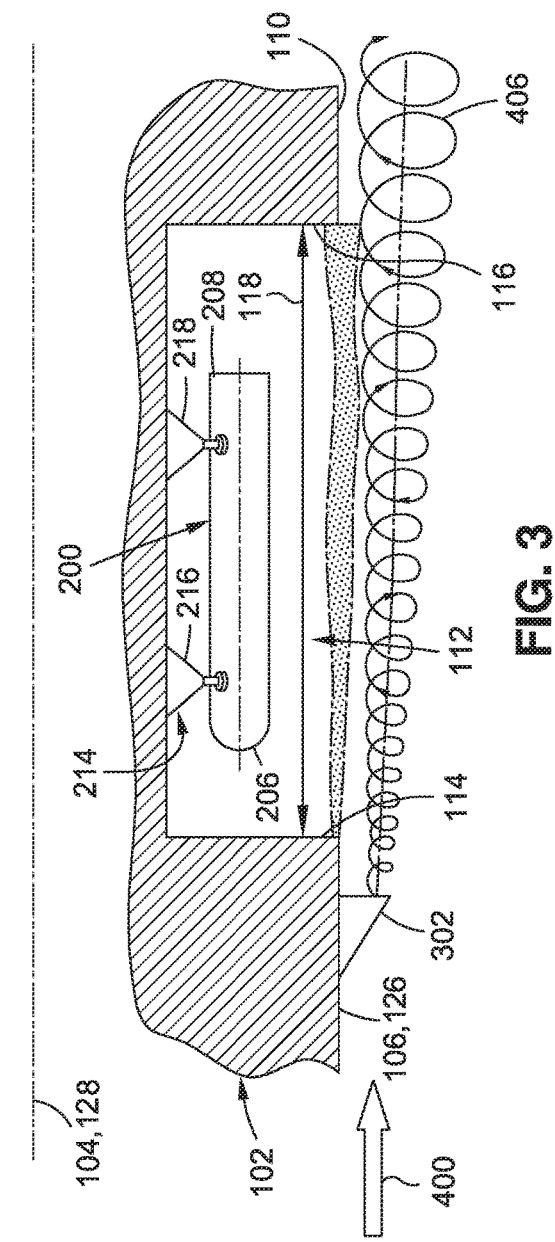

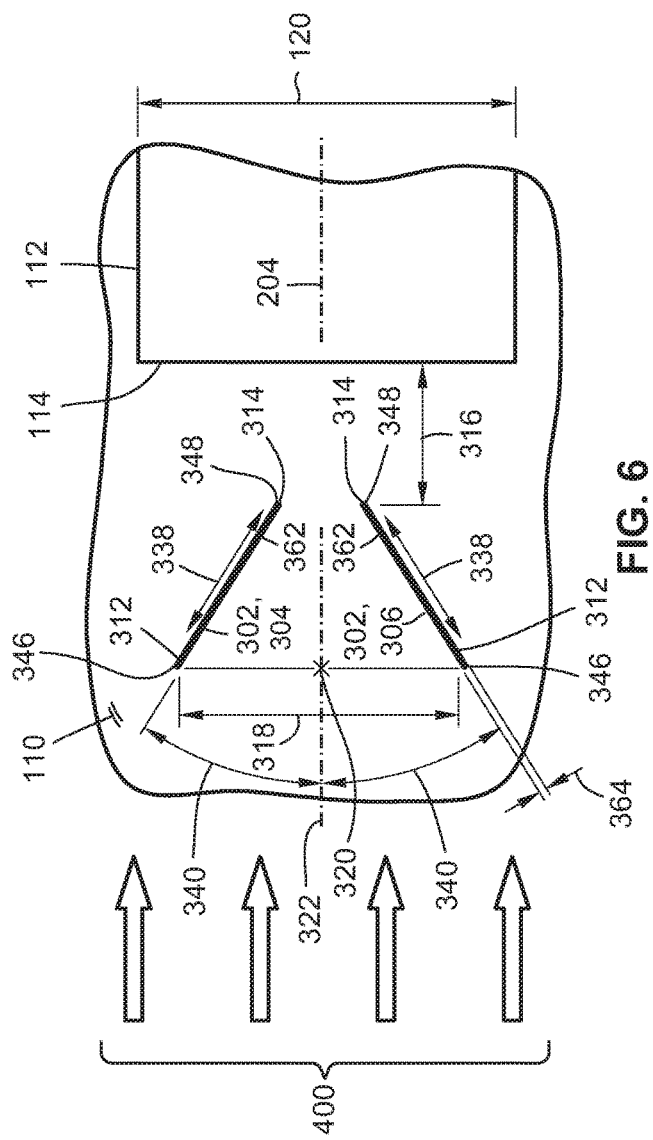

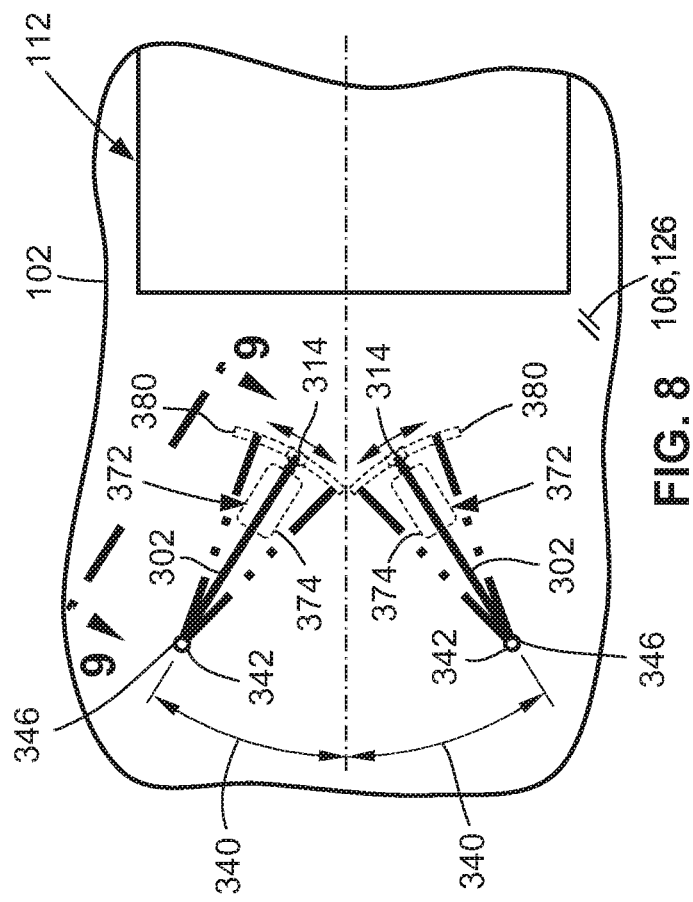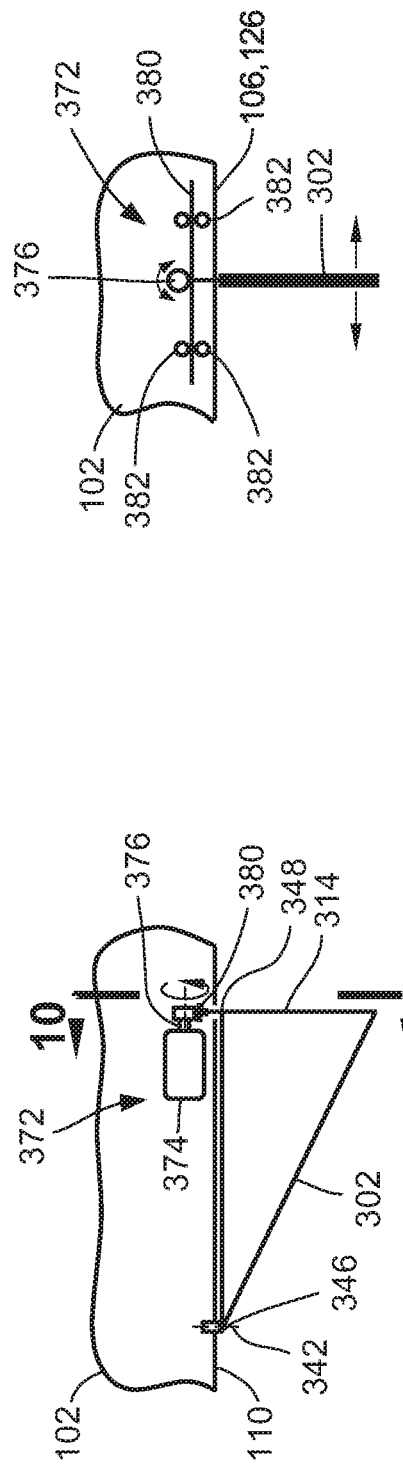

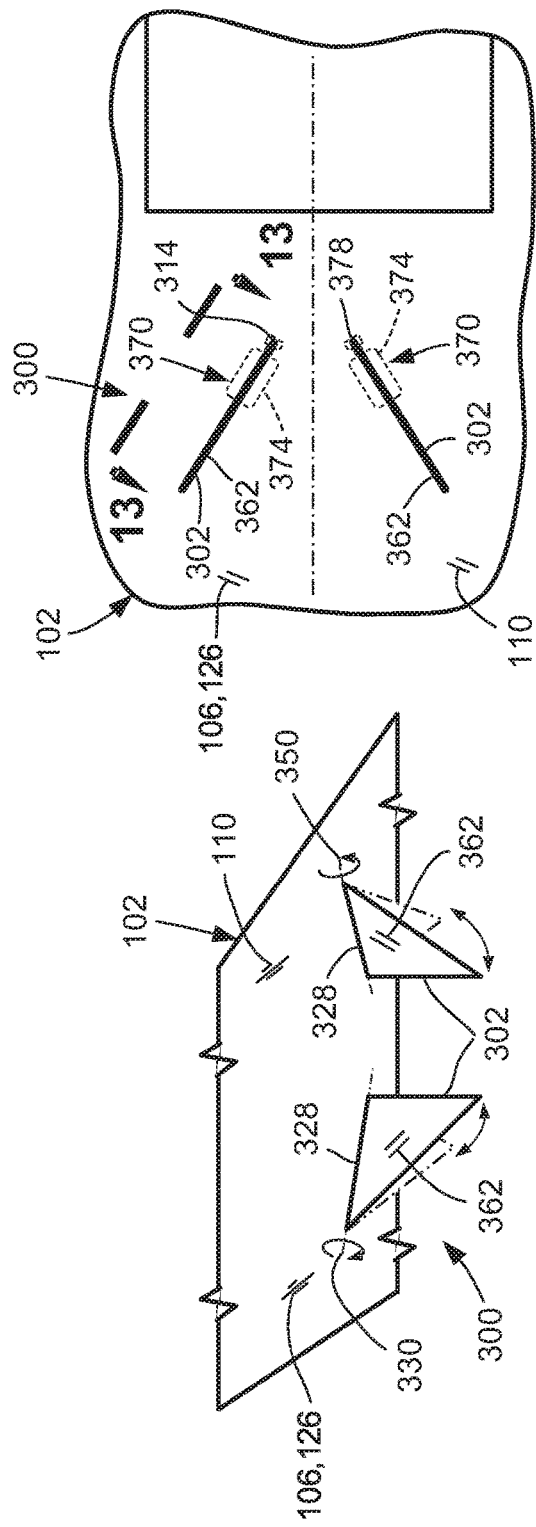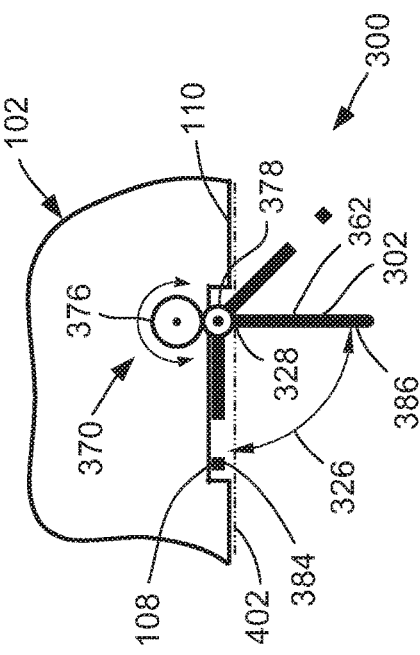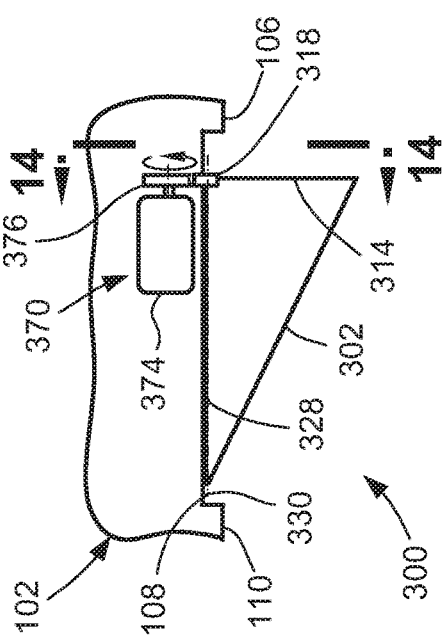

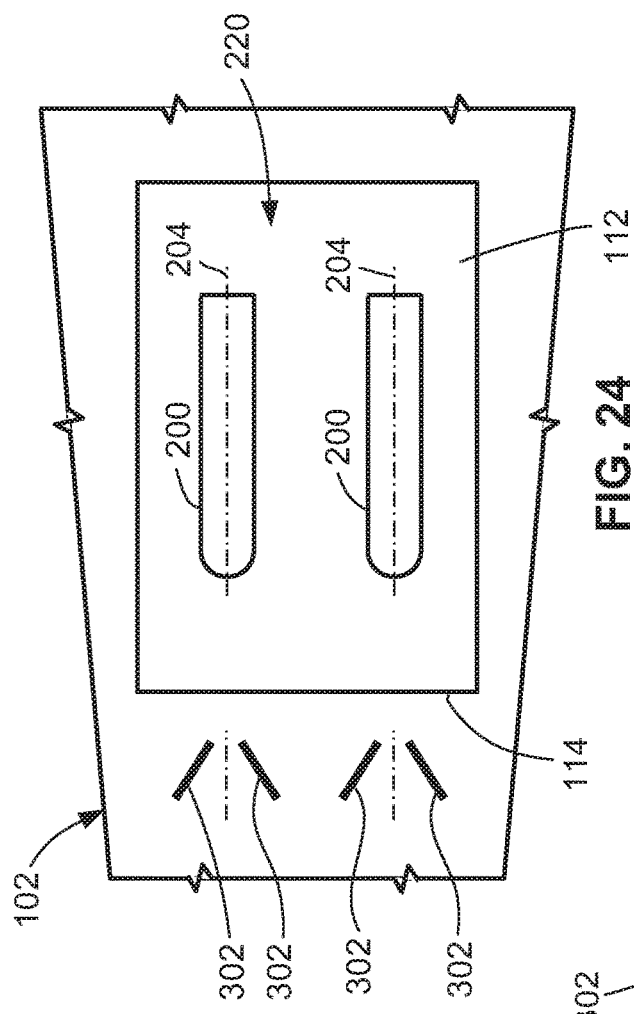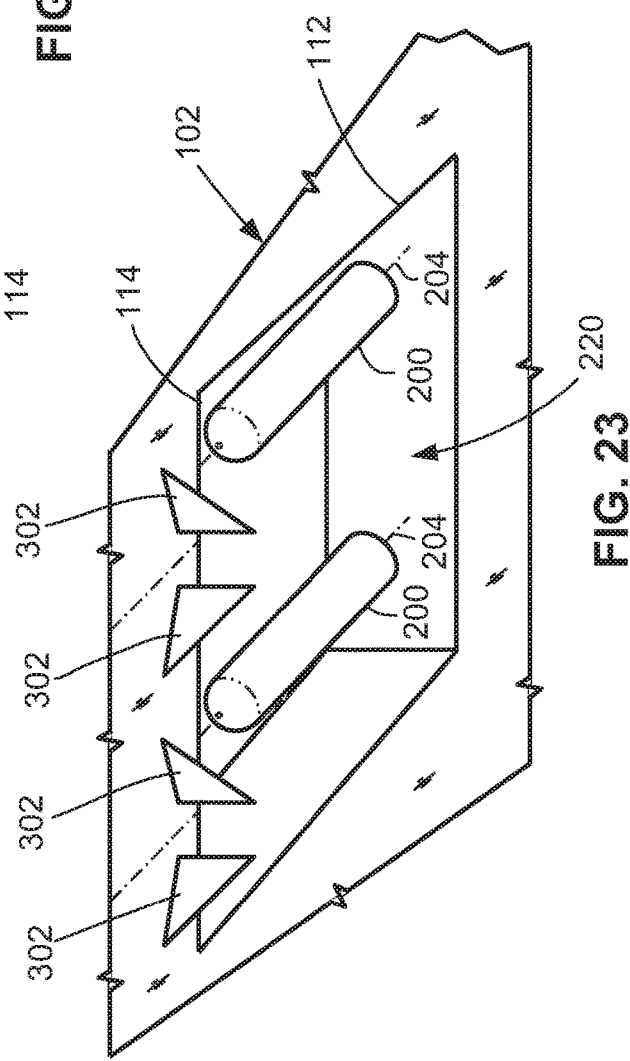

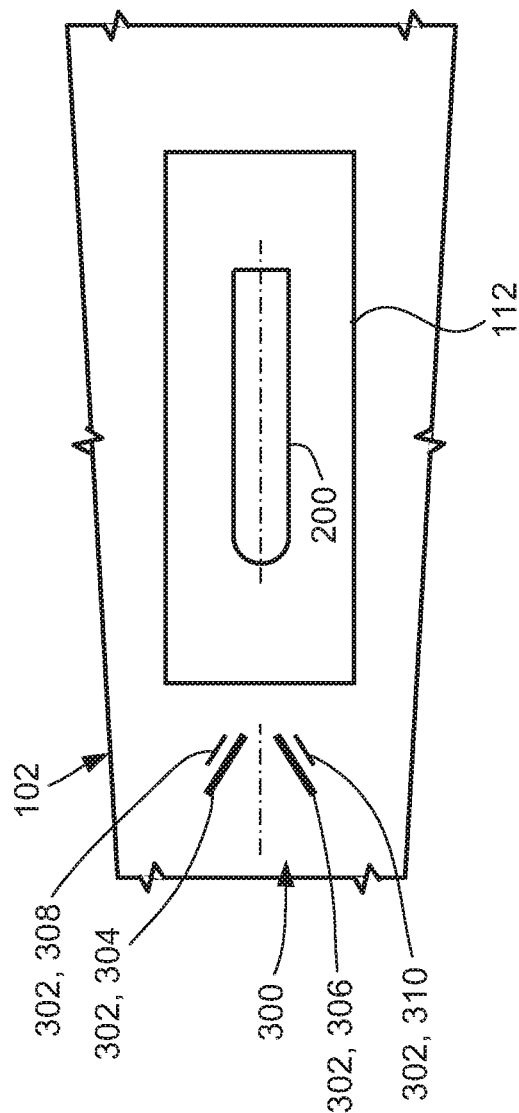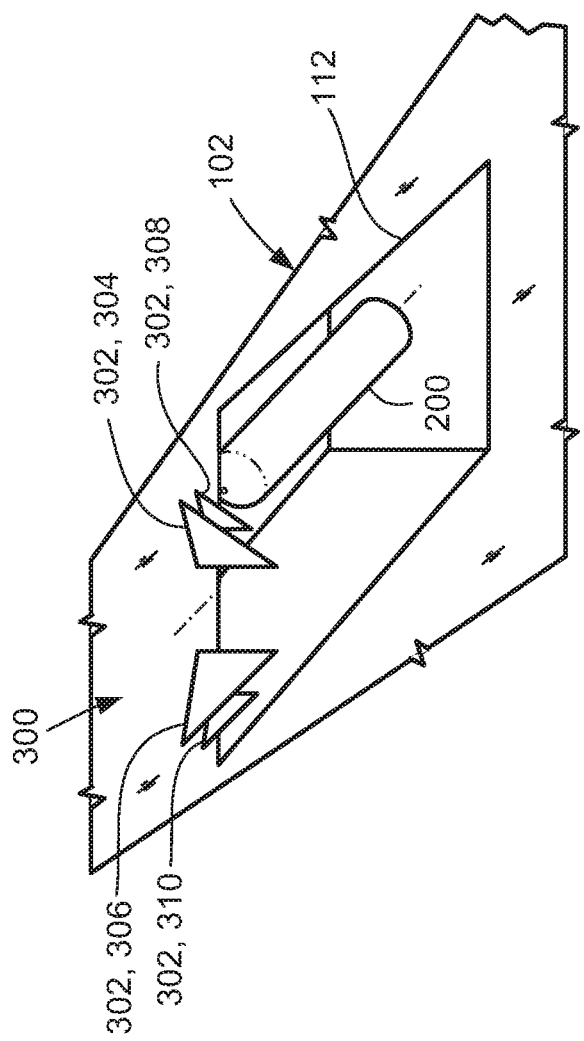

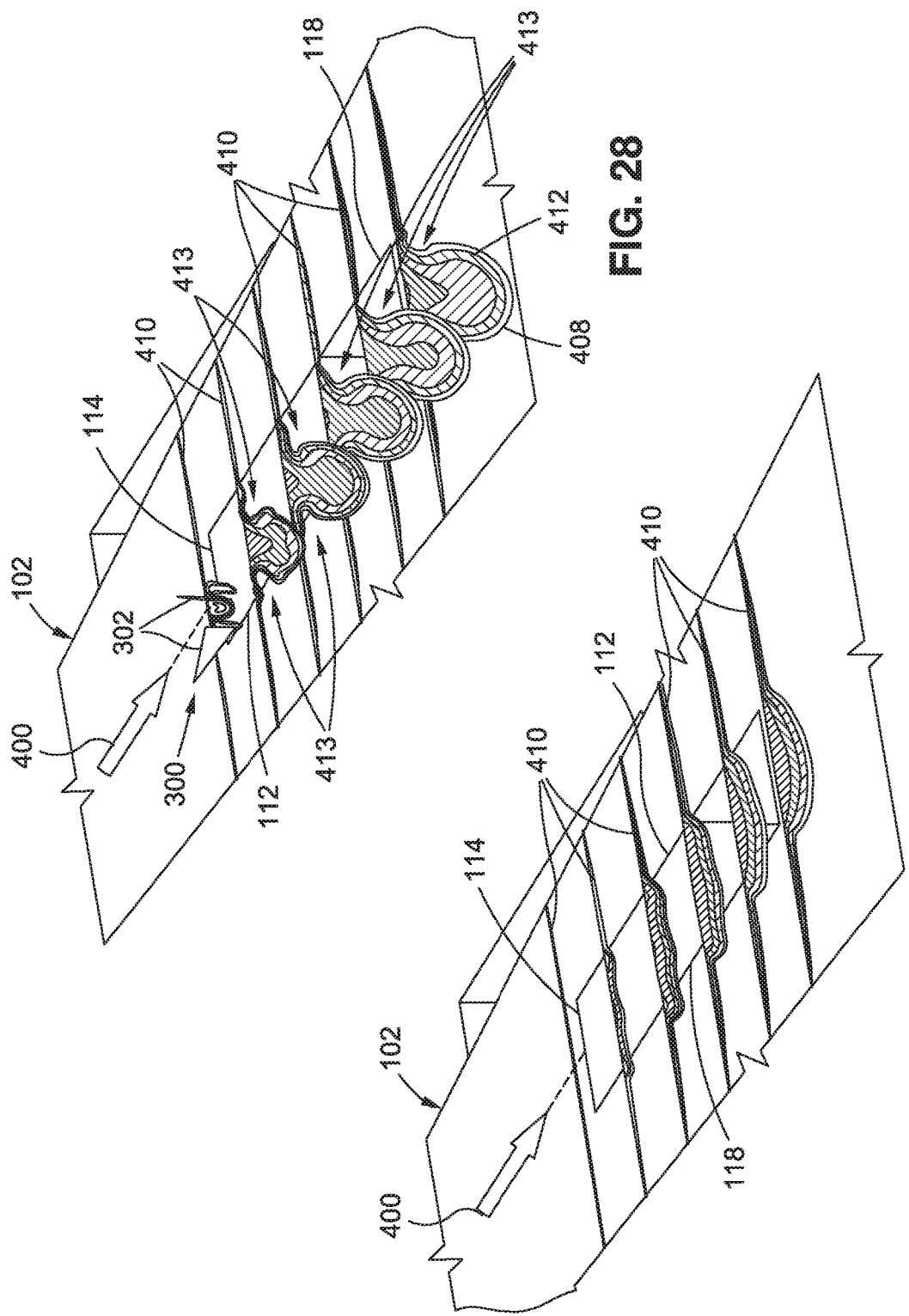

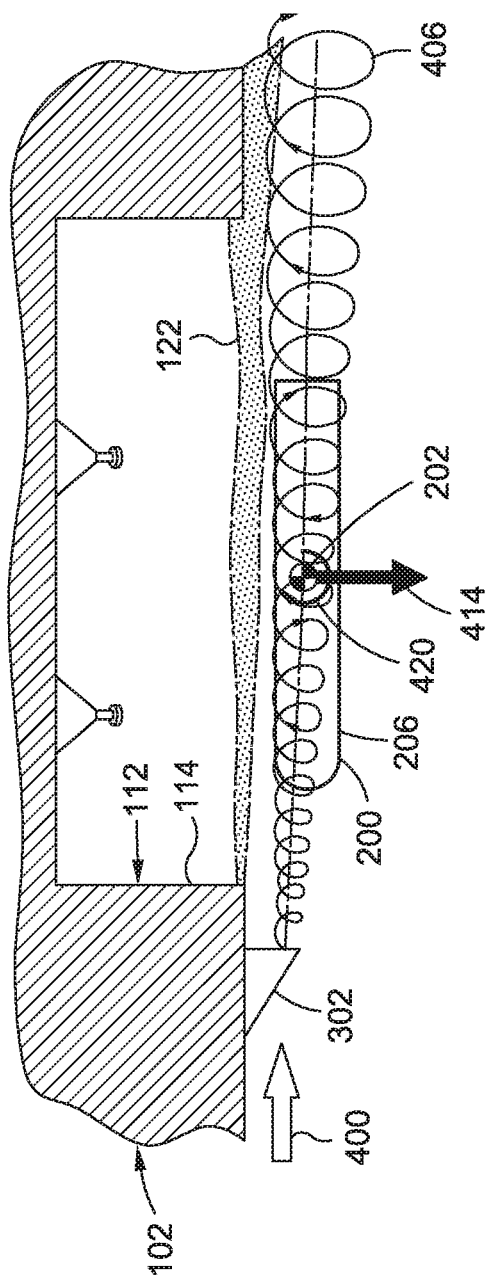

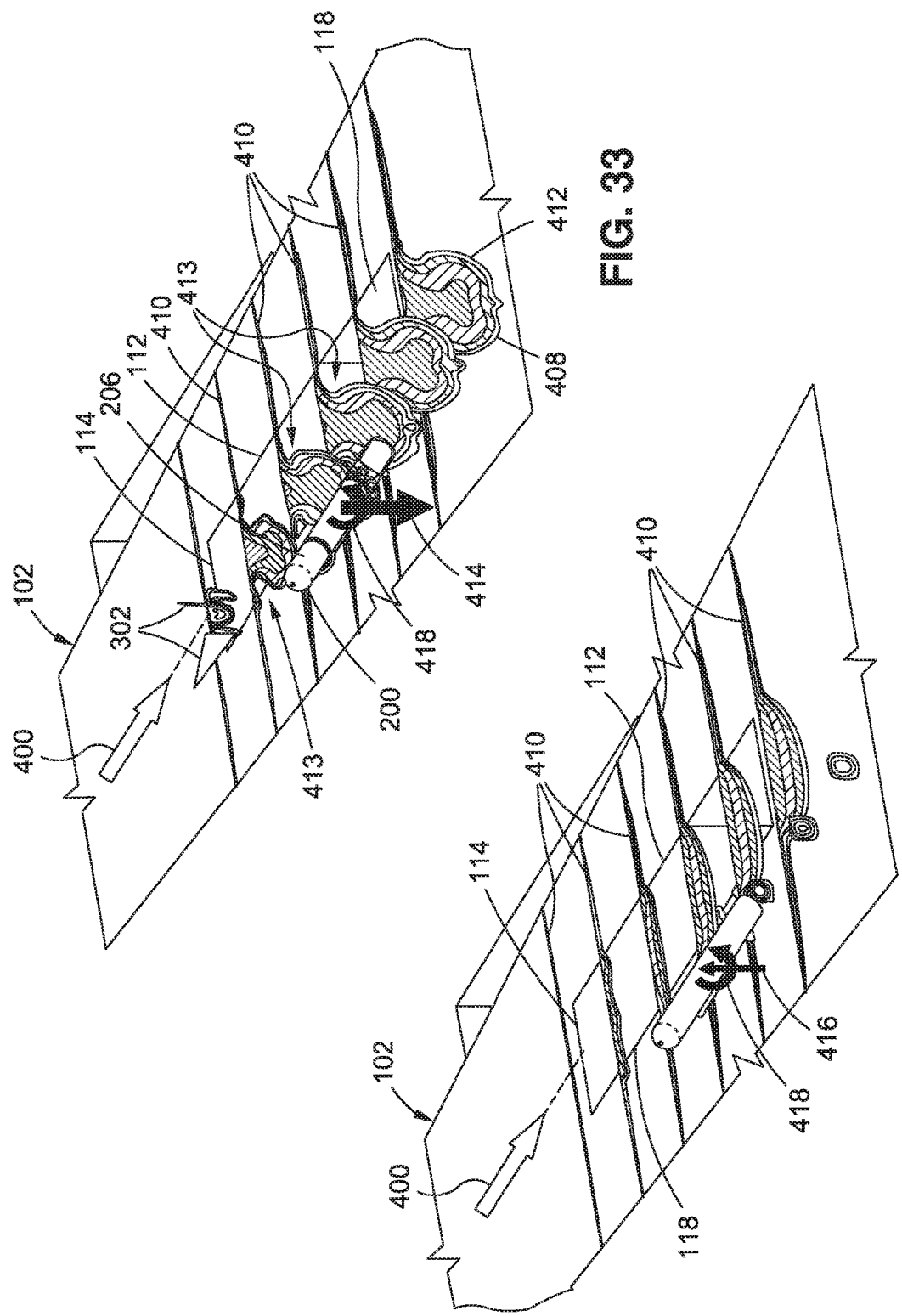

VORTEX GENERATOR SYSTEM AND METHOD FOR ASSISTING IN STORE SEPARATION FROM A VEHICLE, AND AIRCRAFT HAVING VORTEX GENERATOR SYSTEM

FIELD

The present disclosure relates generally to separation of stores from vehicles and, more particularly, to a system and method for assisting in the separation of stores from a vehicle such as a supersonic aircraft.

BACKGROUND

Certain vehicles are configured to carry and release stores such as bombs, missiles and other items. A store may be mounted in a bay or cavity on an underside of a vehicle such as an aircraft, and may be secured in position in the cavity by a store mounting system. Upon release or ejection from the store mounting system, the store falls out of the cavity under the force of gravity, and enters the airstream flowing over the cavity. When a store exits the cavity of an aircraft flying at supersonic speeds, the airstream can have an adverse effect on the store. For example, the airstream can redirect the store, causing it to tumble, with the risk of the store impacting the aircraft.

In an attempt to avoid such adverse effects during store release from a supersonic aircraft, one practice is to limit the flight conditions of the aircraft for store separation events. For example, the airspeed of the aircraft may be temporarily reduced from supersonic to subsonic to allow for store release. However, reducing the airspeed reduces the performance benefits of the aircraft and/or of the store delivery system. For example, reducing the airspeed to subsonic reduces tactical capabilities.

As can be seen, there exists a need in the art for a system and method for separating a store from a vehicle such as an aircraft without reducing the airspeed of the vehicle during store release.

SUMMARY

The above-noted needs associated with store separation are addressed by the presently-disclosed system which includes a vortex generator system for assisting in the separation of a store from a vehicle such as an aircraft. The vortex generator system includes at least two vortex generators protrudable from an outer mold line of a vehicle surface (e.g., an aircraft surface) at a location upstream of a cavity leading edge of a cavity in the vehicle surface. Each one of the vortex generators has a vortex generator forward end, a vortex generator aft end, and a vortex generator lengthwise direction. The at least two vortex generators are spaced apart from each other and oriented such that the vortex generator aft ends are nearer to each than the vortex generator forward ends. The vortex generator lengthwise direction of each one of the vortex generators is oriented at a vortex generator directional angle relative to a direction of an airflow. The at least two vortex generators are configured to generate a pair of counter-rotating vortices when the airflow passes through or over the vortex generators. The counter-rotating vortices interact to produce a downwash of air away from the cavity that urges the store away from the vehicle (e.g., aircraft) as the store exits the cavity.

Also disclosed is an aircraft having a cavity formed in an aircraft surface. The aircraft surface has an outer mold line. The cavity is configured to contain at least one store and has a cavity leading edge. The aircraft includes a pair of vortex generators protrudable from the outer mold line at a location upstream of the cavity leading edge. Each one of the vortex generators has a vortex generator forward end, a vortex generator aft end, and a vortex generator lengthwise direction. The pair of vortex generators are spaced apart from each other and oriented such that the vortex generator aft ends are nearer to each than the vortex generator forward ends. The vortex generator lengthwise direction of each one of the vortex generators is oriented at a vortex generator directional angle relative to a direction of airflow. The pair of vortex generators are configured to generate a pair of counter-rotating vortices when the airflow passes over and/or through the vortex generators. The counter-rotating vortices interact to produce a downwash of air away from the cavity that urges the store away from the aircraft as the store exits the cavity. At least one of the vortex generators has a vortex generator directional adjustment mechanism configured to pivot the vortex generator about a vortex generator directionality pivot axis oriented locally perpendicular to the outer mold line for adjusting the vortex generator directional angle to thereby adjust a strength of the counter-rotating vortices.

Also disclosed is a method for assisting in the separation of a store from a vehicle such as an aircraft. The method includes passing an airflow over at least two vortex generators protruding from an outer mold line of a vehicle surface at a location upstream of a cavity leading edge of a cavity in the vehicle surface. Each one of the vortex generators has a vortex generator forward end, a vortex generator aft end, and a vortex generator lengthwise direction. The vortex generators are spaced apart from each other and oriented such that the vortex generator aft ends are nearer to each other than the vortex generator forward ends. The vortex generator lengthwise direction of each one of the vortex generators is oriented at a vortex generator directional angle relative to the direction of the airflow. The method additionally includes generating, respectively via the at least two vortex generators, counter-rotating vortices when the airflow passes over and through the vortex generators. In addition, the method includes producing a downwash of air away from the cavity as a result of the counter-rotating vortices. Furthermore, the method includes urging, using the downwash of air, the store away from the vehicle as the store exits the cavity.

The features, functions and advantages that have been discussed can be achieved independently in various examples of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a longitudinal sectional view taken along lines 3-3 of FIG. 2 and illustrating the store supported by a store mounting system in the cavity and further showing a side of the vortex generators and vortices respectively generated by the pair of vortex generators;

FIG. 4 is a transverse sectional view taken along lines 4-4 of FIG. 2 and illustrating the store supported within the cavity and further showing the pair of counter-rotating vortices generated by the pair of vortex generators;

FIG. 6 is a bottom view of the vortex generators mounted upstream of the cavity leading edge;

FIG. 7 is a longitudinal sectional view of the vortex generators mounted upstream of the cavity leading edge;

FIG. 8 is a bottom view of a pair of vortex generators in a configuration in which each of the vortex generators is pivotable about a vortex generator pivot axis for adjusting the vortex generator directional angle;

FIG. 9 is a side view of one of the vortex generators taken along lines 9-9 of FIG. 8 and showing an example of a vortex generator orientation adjustment mechanism for pivoting the vortex generator about a vortex generator pivot axis located proximate the vortex generator forward end;

FIG. 10 is an end view of a vortex generator taken along line 10-10 of FIG. 9 and showing an arcuate rack driven by a motor for adjusting the vortex generator directional angle;

FIG. 11 is a perspective view of a pair of vortex generators in a deployable configuration in which each vortex generator is pivotable about a vortex generator hinge line for adjusting the vortex generator standoff angle;

FIG. 12 is a bottom view of the vortex generators of FIG. 11;

FIG. 13 is a side view of one of the vortex generators taken along line 13-13 of FIG. 12 and illustrating a vortex generator actuation mechanism for moving the vortex generator between the stowed position and the deployed position;

FIG. 14 is an end view of a vortex generator taken along lines 14-14 of FIG. 13 in which the vortex generator actuation mechanism comprises a motor driving a pinion gear engaged to another pinion gear fixedly coupled to the vortex generator;

FIG. 23 is a perspective view of a portion of an aircraft having a cavity containing two stores in a tandem arrangement, each store having a dedicated pair of vortex generators for assisting in store separation from the aircraft;

FIG. 24 is a bottom view of the store and vortex generator arrangement shown in FIG. 23;

FIG. 25 is a perspective view of a portion of an aircraft showing one or more additional smaller vortex generators located adjacent to the pair of vortex generators;

FIG. 26 is a bottom view of the vortex generator arrangement shown in FIG. 25;

FIG. 27 is a perspective view of a portion of an aircraft having a cavity, and showing a series of total pressure contour plots at spaced intervals along the streamwise direction and illustrating the results of a computer simulation of supersonic airflow passing over the cavity;

FIG. 28 shows the results of a computer simulation of supersonic airflow passing over and through a pair of vortex generators mounted upstream of a cavity of the same configuration as in FIG. 27, and further illustrating a plurality of total pressure contour plots in the transverse direction of the flowfield taken at uniformly spaced intervals along the streamwise direction, the total pressure contour plots of FIG. 28 illustrating an increase in a downwash of air away from the cavity as generated by the vortex generators;

FIG. 31 is a longitudinal sectional view of the aircraft of FIGS. 29-30 and showing the position of the store relative to the cavity shear layer;

FIG. 32 shows the results of a computer simulation of supersonic airflow on a store located further away from the cavity shear layer of the cavity and illustrating an upward force on the store;

FIG. 33 shows the results of a computer simulation of supersonic airflow passing over and through a pair of vortex generators and the resulting increase in downward force on the store as a result of vortex generators;

DETAILED DESCRIPTION

Figure 1:
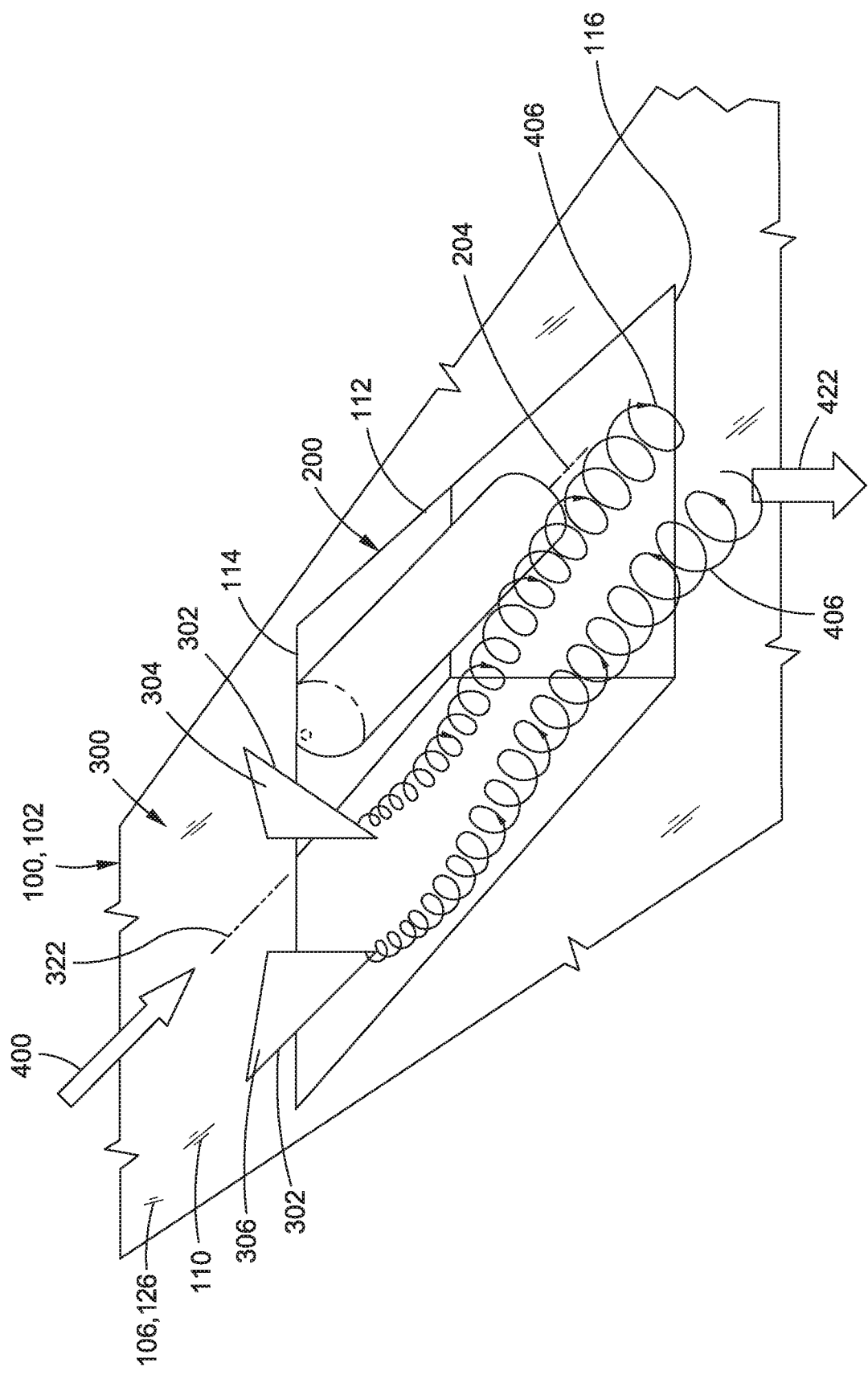
FIG. 1 is a perspective view of a portion of an underside of a vehicle such as an aircraft showing a cavity housing a store and further illustrating a vortex generator system comprising a pair of vortex generators located upstream of the cavity and assisting in the separation of the store away from the vehicle (e.g., aircraft)
Figure 2:
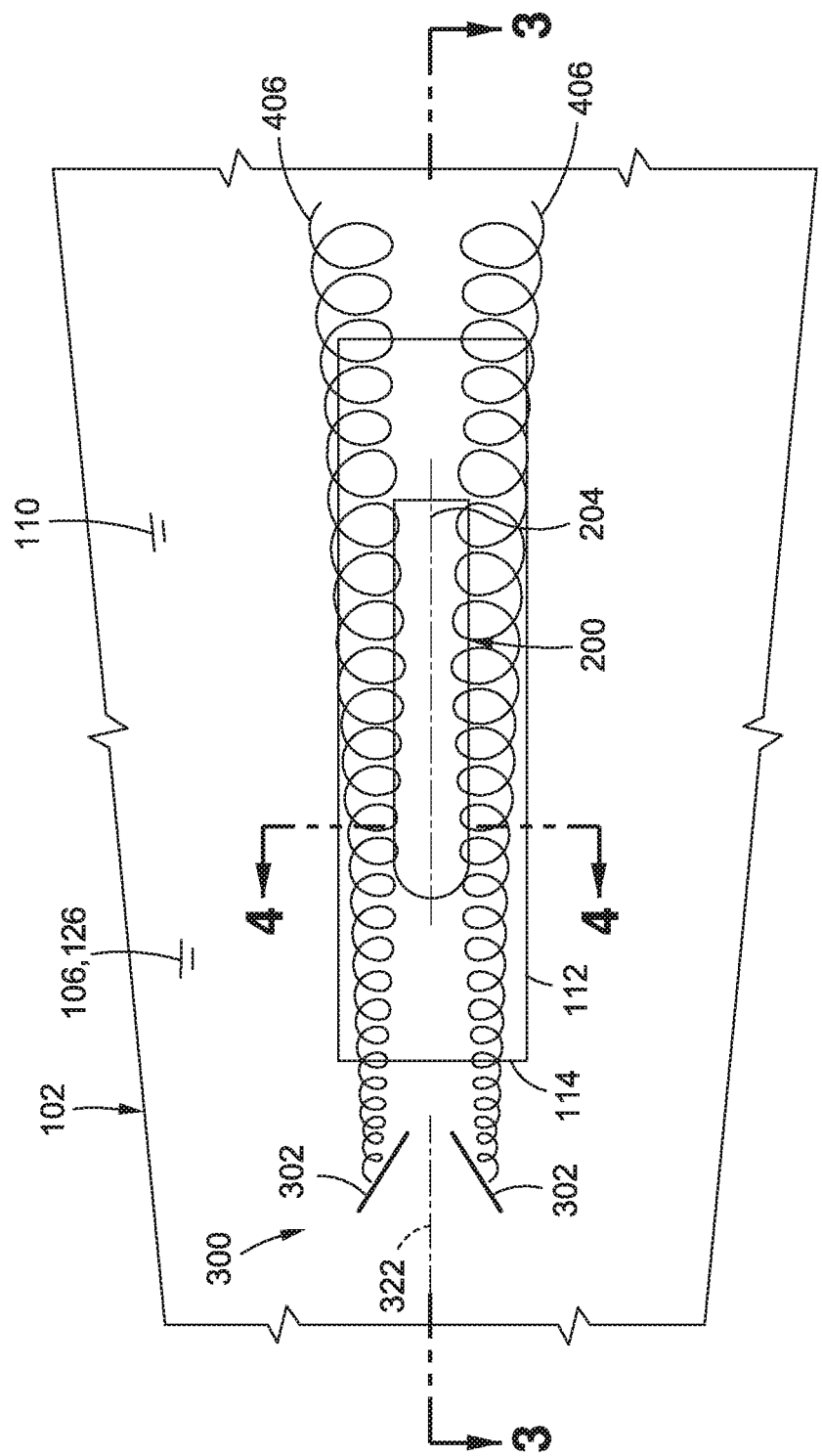
FIG. 2 is a bottom view of the portion of the aircraft underside showing the cavity and the pair of vortex generators located upstream of the cavity leading edge.

Referring now to the drawings which illustrate various examples of the disclosure, shown in FIG. 1 is a perspective view of an example of a vortex generator system 300 installed on a vehicle 100 such as an aircraft 102 for assisting in the separation of a store 200 from the aircraft 102. Although described in the context of an aircraft 102, the presently-disclosed vortex generator system 300 may be implemented on any one of a variety of different types of vehicles 100 including, but not limited to, a missile, a rocket, a re-entry vehicle, or any other vehicle including vehicles configured for supersonic flight. The vortex generator system 300 includes at least two (e.g., a pair of) vortex generators 302 including a first vortex generator 304 (FIG. 1) and a second vortex generator 306 (FIG. 1). The vortex generators 302 protrude from an outer mold line 110 of a vehicle surface 126 (e.g., an aircraft surface 106) at a location upstream of a cavity leading edge 114 of a cavity 112 formed in the vehicle surface 126 and containing one or more stores 200. For examples where the vortex generator system 300 is incorporated into an aircraft 102, the aircraft surface 106 may be located on the underside of a fuselage (not shown), a wing (not shown), or in any one of a variety of other locations on the aircraft 102.

Referring to FIGS. 1-7, each one of the vortex generators 302 has a vortex generator forward end 312 (FIG. 6), a vortex generator aft end 314 (FIG. 6), and a vortex generator lengthwise direction 338 (FIG. 6). The pair of vortex generators 302 are spaced apart from each other and are oriented such that the vortex generator aft ends 314 are nearer to each other than the vortex generator forward ends 312. The vortex generator lengthwise direction 338 of each one of the vortex generators 302 is oriented at a vortex generator directional angle 340 (FIG. 6) relative to a direction of airflow 400 passing over and/or through the vortex generators 302. The vortex generator directional angle 340 is an acute angle (e.g., between 0-90 degrees). The direction of the airflow 400 over the vehicle surface 126 (e.g., aircraft surface 106) may be generally parallel to the direction of forward movement of the vehicle 100 (e.g., aircraft 102). For example, the direction of airflow 400 passing through and/or over the vortex generators 302 may be generally parallel to the vehicle longitudinal axis 128 (e.g., aircraft longitudinal axis 104—FIG. 3). In this regard, the vortex generator directional angle 340 may be defined relative to the vehicle longitudinal axis 128.

Referring to FIGS. 1-7, the pair of vortex generators 302 are configured to generate a pair of counter-rotating vortices 406 (FIGS. 1-4) when the airflow 400 passes through and/or over the vortex generators 302. The vortex generators 302 are arranged and configured such that the counter-rotating vortices 406 interact with each other to produce a streamwise flow field 408 (FIGS. 28, 30, 33) that generates a downwash of air 412 (FIGS. 28, 30, 33) away from the cavity 112. The downwash of air 412 results in an aerodynamic downward force 414 (FIGS. 30-31 and 33-34) that urges the store 200 away from the aircraft 102 as the store 200 exits the cavity 112 after in-flight-release from the aircraft 102. The store 200 may be released from a store mounting system 214 (FIGS. 3-4) contained in the cavity 112. For example, the store mounting system 214 may include a forward mounting point 216 (FIG. 3) configured to attach to the store forward portion 206 (FIG. 3), and an aft mounting point 218 (FIG. 3) configured to attach to the store aft portion 208 (FIG. 3). The downward force 414 (FIGS. 31 and 33) generated by the downwash of air 412 urges the store 200 away from the aircraft 102 as the store 200 is pulled in a downward direction under gravitational force 422 (FIG. 1). In addition to generating a downward force 414 on the store 200, the streamwise flow field 408 produced by the counter-rotating vortices 406 induces a downward pitching moment 418 (FIG. 34) about the store center of gravity 202 (FIGS. 31 and 34) of the store 200 that generally prevents the store 200 from pitching upwardly toward the aircraft 102 as the store 200 exits the cavity 112.

Figure 5:
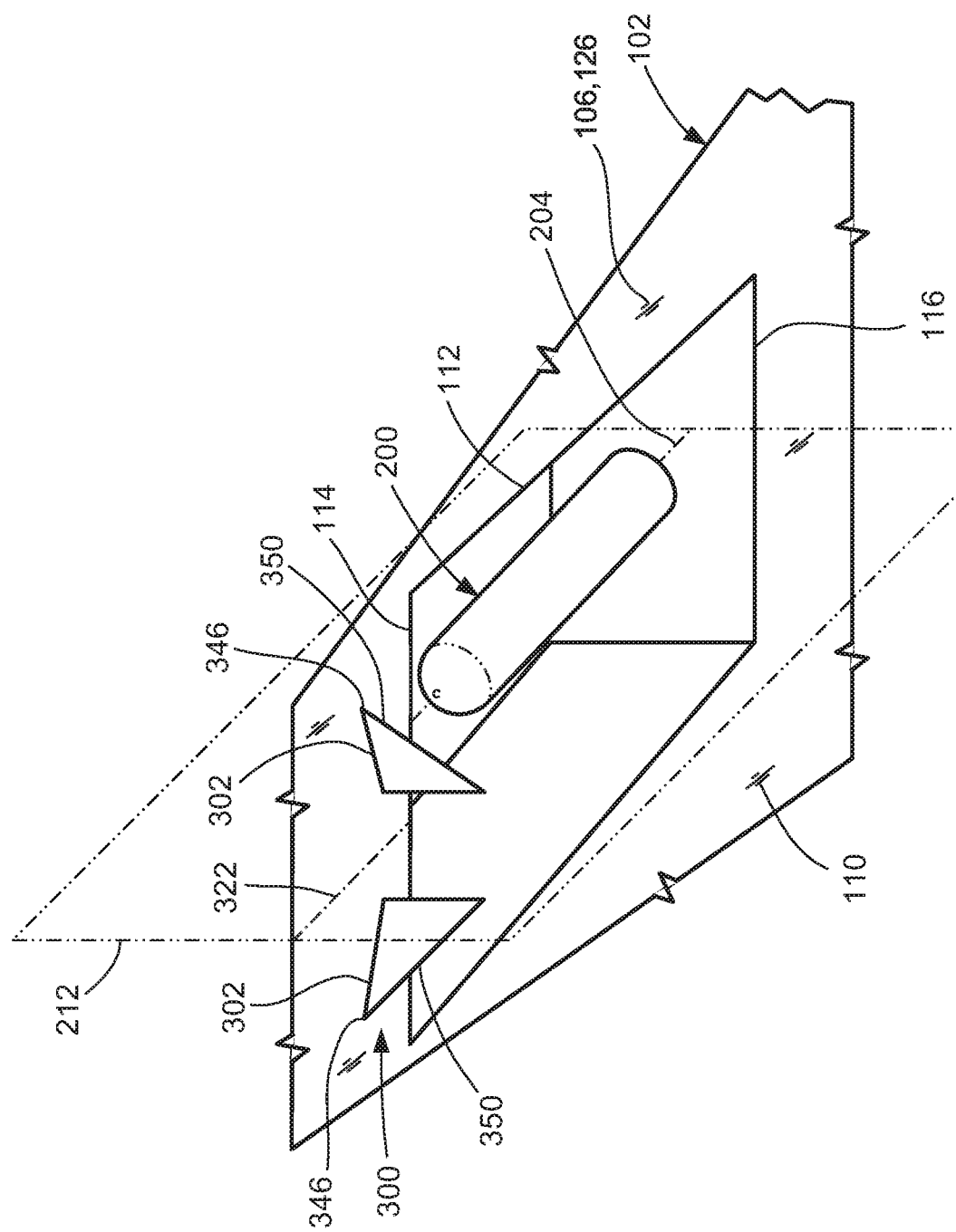
FIG. 5 is a perspective view of a portion of an underside of an aircraft in which the pair of vortex generators are positioned laterally relative to the store such that the store centerline is coincident with a vertical plane oriented parallel to an aircraft longitudinal axis and passing through a vortex generator pair midpoint between the pair of vortex generators.

Referring to FIGS. 5-6, shown in FIG. 5 is a perspective view of a portion of an aircraft 102, and which illustrates an example of the lateral positioning of the vortex generators 302 relative to a store centerline 204 of the store 200. Each one of the vortex generators 302 has a vortex generator leading edge 350 (FIG. 5) and a vortex generator forwardmost point 346 where the vortex generator leading edge 350 intersects the outer mold line 110. The pair of vortex generators 302 define a vortex generator pair midpoint 320 (FIG. 6) located on the outer mold line 110 at a point midway between the vortex generator forwardmost points 346 of the vortex generator forward ends 312. The pair of vortex generators 302 may be positioned laterally relative to the store 200 such that the store centerline 204 is coincident with a vertical plane 212 (FIG. 5) oriented parallel to the vehicle longitudinal axis 128 (e.g., aircraft longitudinal axis 1049—FIG. 3) and passing through the vortex generator pair midpoint 320 (FIG. 6). The intersection of the vertical plane 212 with the outer mold line 110 defines a vortex generator pair centerline 322.

FIG. 6 is a bottom view of the vortex generators 302 mounted upstream of the cavity leading edge 114, and shows the vortex generator directional angle 340 defined relative to the vortex generator pair centerline 322. In some examples of the vortex generator system 300, the vortex generator directional angle 340 of each one of the vortex generators 302 may be between 10-75 degrees. For example, the vortex generator directional angle 340 of each one of the vortex generators 302 may be between 25-55 degrees. The vortex generator directional angle 340 may be the same for each one of the vortex generators 302. However, as shown in the figures, the vortex generators 302 are oriented in opposite directions, and which results in the counter-rotating vortices 406 (FIGS. 1-4).

In FIGS. 1-7, the pair of vortex generators 302 are symmetrically arranged relative to the store centerline 204, and may be configured substantially similar to each other. For example, the vortex generators 302 may have substantially the same geometry or shape, vortex generator length 349 (FIGS. 19-20), maximum vortex generator height 324 (FIG. 7), and/or vortex generator thickness 364 (FIG. 6). The vortex generators 302 may be oriented at substantially the same vortex generator directional angle 340 (FIG. 6), although the vortex generators 302 point in opposite directions. For example, the first vortex generator 304 (FIG. 6) may be oriented at a vortex generator directional angle 340 of +45 degrees relative to the store centerline 204, and the second vortex generator 306 may be oriented at a vortex generator directional angle 340 of −45 degrees relative to the store centerline 204. The vortex generators 302 may also be mounted at approximately the same location relative to the cavity leading edge 114, and which may be described as the vortex generator-cavity spacing 316 (FIGS. 6-7). However, in other examples not shown, the pair of vortex generators 302 may have different geometries and/or different sizes, and may be oriented at different vortex generator directional angles 340 and/or may be mounted at different vortex generator-cavity spacings 316.

Figures 29, 30:
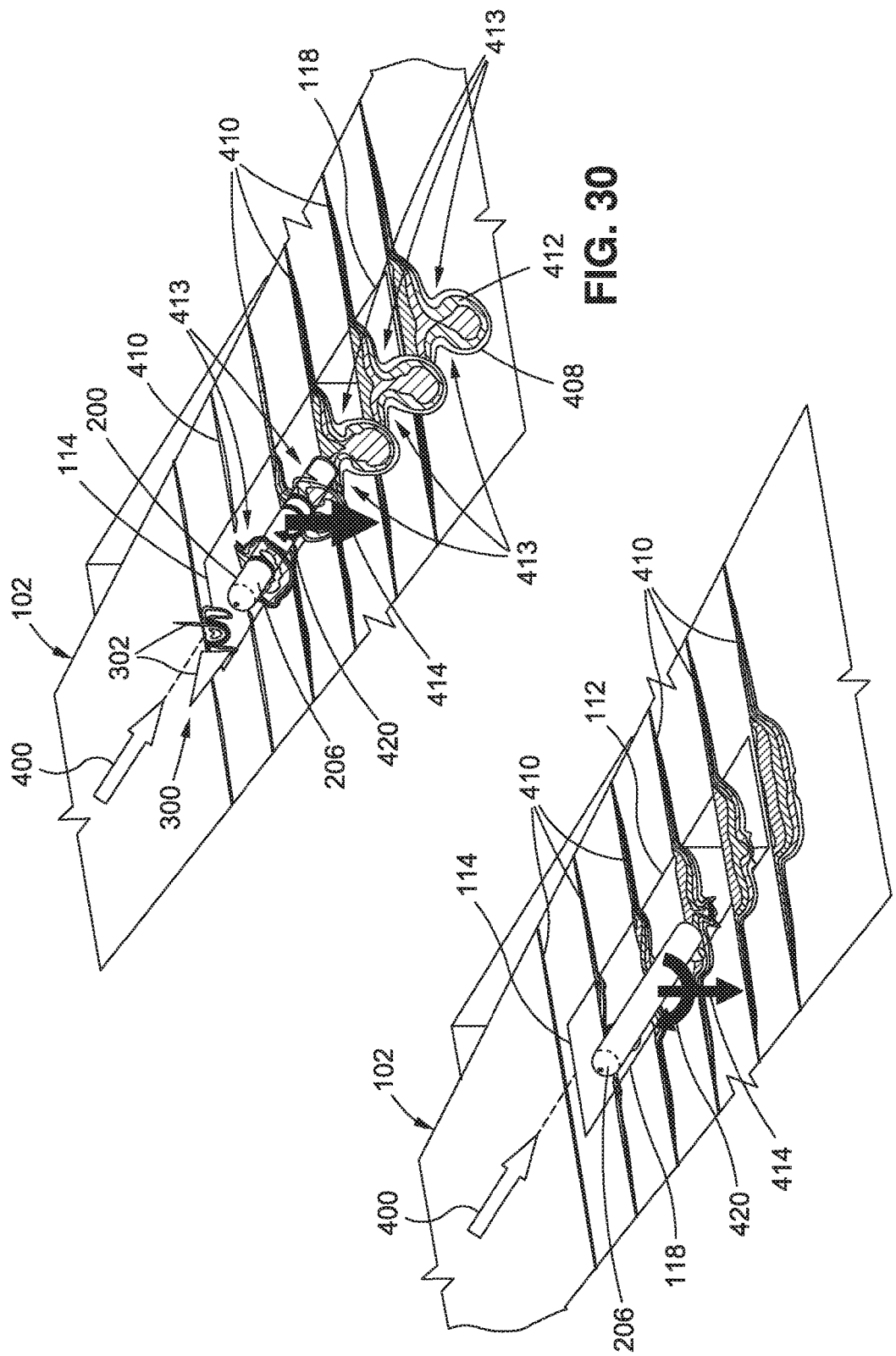
FIG. 29 shows the results of a computer simulation of supersonic airflow on a store just outside of a cavity shear layer of the cavity, and illustrating a relatively large upward pitching moment on the store.
FIG. 30 shows the results of a computer simulation of supersonic airflow passing over and through a pair of vortex generators and the resulting increase in downward force on the store and reduced upward pitching moment on the store as a result of the vortex generators.

In the example of FIGS. 1-7, the pair of vortex generators 302 include no other vortex generators on either side of the pair of vortex generators 302, and which is in contrast to conventional vortex generator installations (not shown) that typically comprise a linear array of vortex generators arranged at a uniform spacing (e.g., along a wing leading edge). Furthermore, conventional vortex generator installations may create a flowfield that is generally constant along a direction generally perpendicular to the airflow direction. In contrast, the presently-disclosed vortex generator system 300 is configured to generate a strongly-developed three-dimensional streamwise flow field 408 (FIGS. 28, 30, 33).

For example, and referring briefly to FIGS. 28, 30, and 33 described in greater detail below, the streamwise flow field 408 generated by the vortex generator system 300 is three-dimensional in the sense that in the streamwise direction, the counter-rotating vortices 406 pull in air from outside of the counter-rotating vortices 406, and pinch 413 the air immediately outside of the cavity shear layer 122 (FIGS. 31 and 34), which may be described as a layer of turbulence generated by the cavity leading edge 114 separating weak air flow inside the cavity 112 from high speed flow outside the cavity 112. The pinching of the air by the counter-rotating vortices 406 generates the above-mentioned downward force 414 on the store 200, and also results in a downward pitching moment 418 on the store forward portion 206 as the store 200 moves away from the cavity shear layer 122. In this regard, the counter-rotating vortices 406 generated by the pair of vortex generators 302 reduce otherwise adverse aerodynamic forces typically encountered by a store when separating from an aircraft (e.g., supersonic aircraft) lacking the presently-disclosed vortex generator system 300. For example, the presently-disclosed vortex generator system 300 may reduce or eliminate an upward pitching moment 420 otherwise imposed on a store 200 exiting the cavity 112 of an aircraft lacking the vortex generator system 300.

Referring to FIGS. 6-7, the cavity 112 has a cavity length 118 (FIG. 3) extending between the cavity leading edge 114 and the cavity trailing edge 116 (FIG. 3). Each one of the vortex generators 302 is located such that the vortex generator aftmost point 348 on the vortex generator aft end 314 is located forward of the cavity leading edge 114 by a distance of less than one-half the cavity length 118. As mentioned above, the longitudinal distance between the vortex generator aftmost point 348 and the cavity leading edge 114 may be described as the vortex generator-cavity spacing 316. Although not shown, in some examples, the vortex generator aftmost point 348 may be located proximate (e.g., within several inches of) the cavity leading edge 114. The size of the vortex generator-cavity spacing 316 may be dictated by the cavity length 118, the store length, the forward-aft location of the store 200 within the cavity 112, and/or by other parameters.

Referring to FIG. 6, the pair of vortex generators 302 may be spaced apart from each other by a vortex generator lateral spacing 318. The vortex generator lateral spacing 318 may be such that the vortex generator forwardmost points 346 are separated by a lateral distance of between 10-75 percent of the cavity width 120. For example, the vortex generator lateral spacing 318 may be in the range of approximately 25-50 percent of the cavity width 120. However, in other samples, the vortex generator lateral spacing 318 may be defined in terms of the store diameter 210 (FIG. 4). For example, the vortex generator lateral spacing 318 may be less than three (3) times the store diameter 210. In the present disclosure, the store diameter 210 may be described as the maximum width or diameter of a representative store 200. Although the figures of the present disclosure illustrate the store 200 as a generally cylindrical object having a substantially constant cross section (i.e., a constant store diameter 210), the store 200 is representative of any one of a variety of store configurations that may be carried by an aircraft 102 incorporating the presently-disclosed vortex generator system 300, and is not limited to a cylindrical object having a generally constant diameter.

Referring to FIG. 7, shown is a longitudinal sectional view of the vortex generators 302 mounted upstream of the cavity leading edge 114. Also shown is a representation of the boundary layer 402 above the aircraft surface 106, and which has a boundary layer thickness 404. As mentioned above, each one of the vortex generators 302 has a vortex generator leading edge 350 and a vortex generator trailing edge 351 located at the vortex generator aft end 314 (FIG. 6). In some examples, the vortex generator aft end 314 may define the maximum vortex generator height 324 above the outer mold line 110 of the aircraft 102. In the present disclosure, the maximum vortex generator height 324 may be in the range of two (2) times the boundary layer thickness 404, to one-half of the cavity width 120 (FIG. 6).

Referring to FIGS. 8-10, shown in FIG. 8 is a bottom view of a pair of vortex generators 302 in a configuration in which the vortex generators 302 are pivotable for adjusting the vortex generator directional angle 340. In the example shown, each one of the vortex generators 302 is configured to be pivotable about a vortex generator directionality pivot axis 342. The vortex generator directionality pivot axis 342 may be oriented locally perpendicular to the outer mold line 110 (FIG. 9). Adjustment of the vortex generator directional angle 340 may result in a corresponding change in the vortex generator lateral spacing 318 (FIG. 6). The vortex generator directional angle 340 of each of the vortex generators 302 may be adjusted as a means for changing one or more characteristics of the vortices 406 generated by the vortex generators 302. For example, changing the vortex generator directional angle 340 of each of the vortex generators 302 may result in a change in the strength of the counter-rotating vortices 406 (FIGS. 1-4) generated by the pair of vortex generators 302, and which may result in a change in the magnitude of the downward force 414 (FIGS. 30-31, 33-34) and/or a change in the magnitude of the pitching moment imposed on the store 200 (FIGS. 30-31, 33-34) as the store 200 exits the cavity 112. Although FIGS. 8-9 show the vortex generator directionality pivot axis 342 located at the vortex generator forwardmost point 346, the vortex generator directionality pivot axis 342 may be located at any point along the vortex generator length 349, such as proximate a vortex generator mid-length point (not shown), or the vortex generator directionality pivot axis 342 may be located proximate the vortex generator aftmost point 348.

Referring still to FIGS. 8-10, the vortex generator directional angle 340 may be ground-adjustable and/or in-flight adjustable. Ground adjustment of the vortex generator directional angle 340 may be manually performed, such as by using hand tools (not shown). Alternatively, ground adjustment or in-flight adjustment of the vortex generators 302 may be motorized. For example, each one of the vortex generators 302 may include a vortex generator directional adjustment mechanism 372 to facilitate adjustment of the vortex generator directional angle 340 (FIG. 8) in response to a command input from a member of the flight crew. Alternatively, an aircraft may include a vortex generator directional adjustment mechanism 372 configured to autonomously (e.g., without human intervention) adjust the vortex generator directional angle 340 of a vortex generator 302 based on one or more parameters including, but not limited to, one or more aircraft parameters including airspeed, altitude, ambient air pressure, ambient air temperature, aircraft 102 angle of attack, and/or store parameters including store shape, store size (e.g., the store length, the store diameter 210), store mass, location of store center of gravity 202 (FIGS. 31, 34), and/or any one of a variety of other parameters.

The vortex generator directional angle 340 may be different for different aircraft parameters (e.g., Mach number, air pressure, etc.) and/or different store sizes (e.g., store length, store diameter, store mass, etc.). For example, a higher Mach number at store release may dictate a reduced vortex generator directional angle 340 to cause the vortex generators 302 to generate counter-rotating vortices 406 that result in a reduction in the strength of the downwash of air 412 (FIGS. 28, 30, 33) on the store 200 to avoid an overly strong upward pitching moment 420 (e.g., FIGS. 30, 31, 33, 34) on the store 200. A larger (e.g., longer) or heavier store 200 may dictate an increased vortex generator directional angle 340 to cause the vortex generators 302 to generate counter-rotating vortices 406 that result in a stronger downwash of air 412 on the store 200 than would be required for a smaller or lighter-weight store 200.

Referring still to FIGS. 8-10, each vortex generator directional adjustment mechanism 372 may be configured as an actuator for pivoting the vortex generator 302 about the vortex generator directionality pivot axis 342. In the example shown, the vortex generator directional adjustment mechanism 372 for each vortex generator 302 may include an arcuate rack 380 extending from a base of the vortex generator 302 at the vortex generator aft end 314. The arcuate rack 380 may include a plurality of gear teeth (not shown). Each arcuate rack 380 may be guided by one or more pairs of guide rollers 382 positioned on opposing sides of the arcuate rack 380. Each arcuate rack 380 may be moved by a motor 374 driving a drive gear 376 having gear teeth (not shown) engaged to the gear teeth of the arcuate rack 380. The motor 374 may be an electromechanical motor. However, in other examples, the vortex generator directional adjustment mechanism 372 may be hydraulically driven or pneumatically driven. Furthermore, the vortex generator directional adjustment mechanism 372 may be provided in any one of a variety of alternative configurations, and is not limited to the motor-arcuate rack arrangement shown in FIGS. 8-10.

In some examples of the vortex generator system 300, each one of the vortex generators 302 may be fixedly mounted to the aircraft surface 106. In this regard, each one of the vortex generators 302 may be oriented at a fixed vortex generator standoff angle 326 (e.g., FIG. 14) relative to the aircraft surface 106. In the example of FIGS. 1-7, each vortex generator 302 may be locally perpendicular to the aircraft surface 106. However, in other examples not shown, each vortex generator 302 may be fixedly oriented at a non-perpendicular vortex generator standoff angle 326.

Referring to FIGS. 11-14, shown is an example of a vortex generator system 300 in which each vortex generator 302 is pivotable for adjusting the vortex generator standoff angle 326 (FIG. 14). Alternatively or additionally, the vortex generators 302 may each be independently movable between a stowed position 384 (FIG. 14) and a deployed position 386 (FIG. 14). In the stowed position 384, each vortex generator 302 may be non-protruding from a boundary layer 402 of the airflow 400 (FIG. 1) passing over the outer mold line 110, and in the deployed position 386, each vortex generator 302 may protrude beyond the boundary layer 402, as described below.

Referring still to FIGS. 11-14, each one of the vortex generators 302 has a vortex generator base portion 328 located proximate the outer mold line 110 of the aircraft surface 106. In addition, each one of the vortex generators 302 has opposing vortex generator side surfaces 362 which define the vortex generator standoff angle 326 relative to the outer mold line 110. Each one of the vortex generators 302 is pivotable about a vortex generator hinge line 330 extending along the vortex generator lengthwise direction 338 (FIG. 6) and located proximate the vortex generator base portion 328. In some examples, the vortex generator standoff angle 326 of each one of the vortex generators 302 may be adjustable on the ground and/or adjustable in-flight. In this regard, each one of the vortex generators 302 may include a vortex generator actuation mechanism 370 as described below for adjusting the vortex generator standoff angle 326.

The vortex generator standoff angle 326 of one or both of the vortex generators 302 may be adjusted as a means to adjust the strength of the counter-rotating vortices 406 (FIGS. 1-4) produced by the vortex generators 302, to thereby change the strength of the downward force 414 (FIGS. 31 and 34) and/or pitching moment (FIGS. 31 and 34) imposed on the store 200. The vortex generator standoff angle 326 may be adjusted based on one or more parameters, such as the above-described aircraft parameters and/or store parameters, and which may also be the basis for adjusting the vortex generator directional angle 340. In some examples, each vortex generator 302 may be pivotable between a vortex generator standoff angle 326 of between 45-135 degrees. However, in other examples, each vortex generator 302 may be pivotable between a vortex generator standoff angle 326 of 0-180 degrees. As mentioned above, each vortex generator 302 may be pivotable by the vortex generator actuation mechanism 370 between a stowed position 384 and a deployed position 386. In the stowed position 384 with the vortex generators 302 side surfaces generally parallel to the outer mold line 110, the vortex generator standoff angle 326 may be approximately 0 degrees. In the deployed position 386, the vortex generator standoff angle 326 may be such that the vortex generator 302 at least partially protrudes from the boundary layer 402.

In FIGS. 11-14, the vortex generator actuation mechanism 370 of each vortex generator 302 may comprise a motor 374 driving a drive gear 376 having gear teeth (not shown). The drive gear 376 may be engaged to the gear teeth (not shown) of a pinion gear 378 fixedly coupled to the vortex generator base portion 328 proximate the vortex generator aft end 314. Rotation of the drive gear 376 by the motor 374 may cause corresponding rotation of the pinion gear 378 and pivoting of the vortex generator 302 about the vortex generator hinge line 330. To reduce aerodynamic drag otherwise generated by the vortex generators 302 in the stowed position 384, the aircraft surface 106 may include a recess 108 (FIGS. 13-14) in the outer mold line 110 for receiving a vortex generator 302 when pivoted into the stowed position 384.

Figure 15:
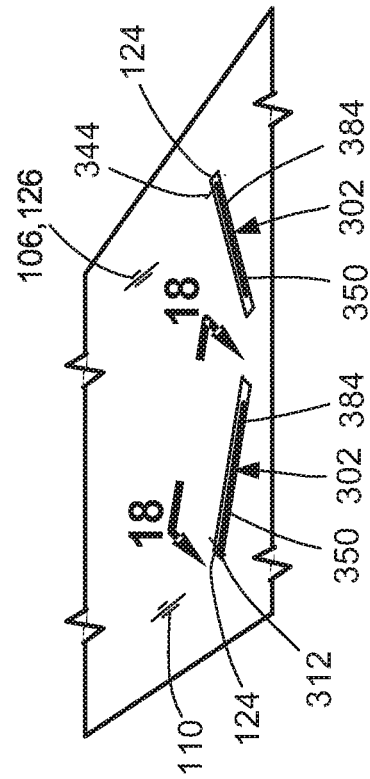
FIG. 15 is a perspective view of a further example of a deployable configuration of the pair of vortex generators shown in the deployed position, and in which each one of the vortex generators is movable into and out of an opening or slot formed in the aircraft surface.
Figure 17:
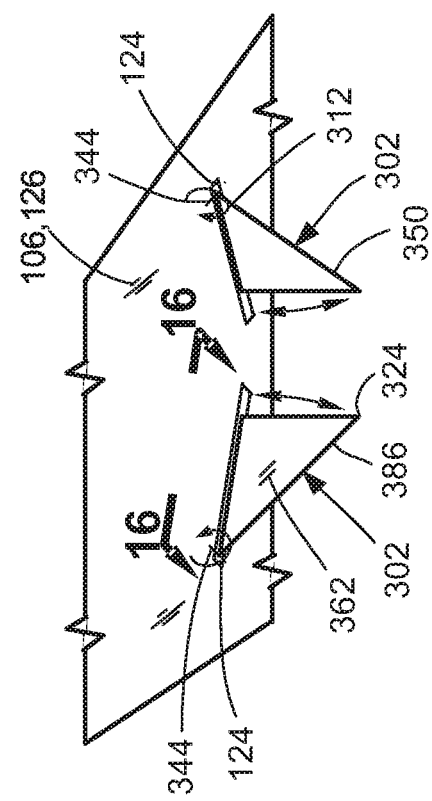
FIG. 17 is a perspective view of the vortex generators in the stowed position in which each vortex generator is flush with or submerged below the outer mold line of the aircraft surface.
Figure 16:
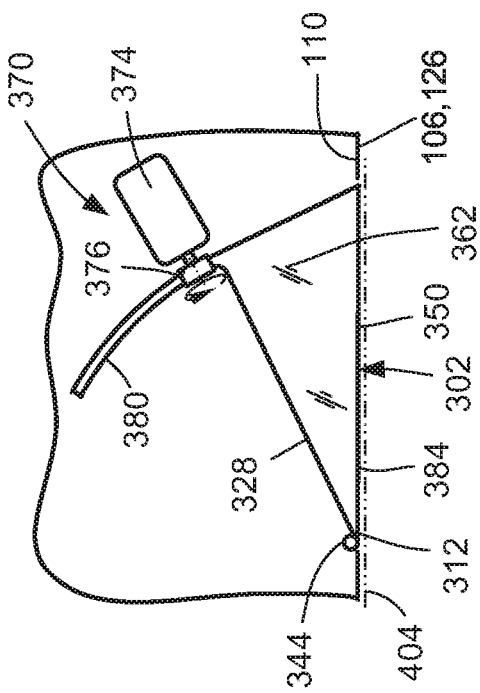
FIG. 16 is a side view of a vortex generator taken along lines 16-16 of FIG. 15 showing the vortex generator in the deployed position, and further illustrating the vortex generator deployment mechanism configured as a motor driving a pinion gear engaged to an arcuate rack extending from the vortex generator base portion into the opening formed in the aircraft surface.
Figure 18:
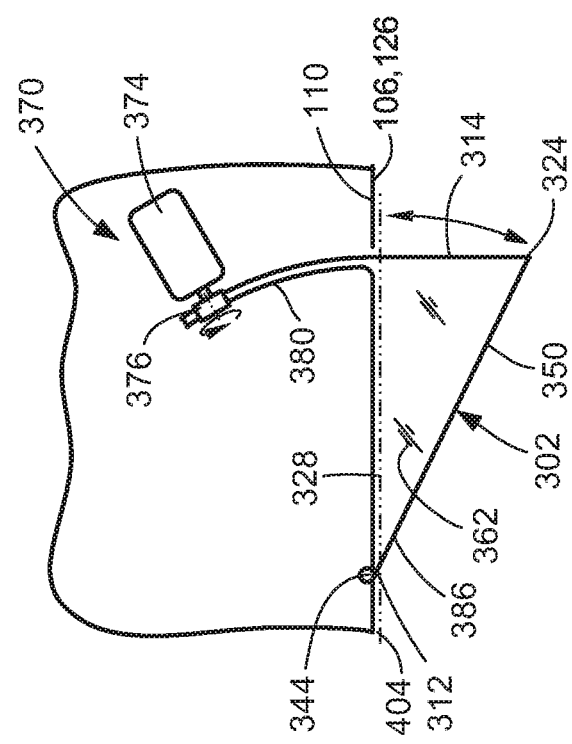
FIG. 18 is a side view of a vortex generator taken along lines 18-18 of FIG. 17 showing the vortex generator in the stowed position.

Referring to FIGS. 15-18, shown is a further example of a deployable configuration of the vortex generators 302 in which each one of the vortex generators 302 is movable into and out of an opening or slot 124 (FIGS. 15 and 17) formed in the aircraft surface 106. In the arrangement shown, each one of the vortex generators 302 may be movable along a direction parallel to the vortex generator side surfaces 362 for moving the vortex generator 302 between the stowed position 384 (FIGS. 17-18) in which the vortex generator leading edge 350 is at least partially retracted into the aircraft surface 106, and the deployed position 386 in which the vortex generator leading edge 350 protrudes beyond the boundary layer thickness 404. For example, FIGS. 15-16 illustrates the vortex generators 302 in the deployed position 386 at a maximum vortex generator height 324. In one example of moving a vortex generator 302 into the stowed position 384, the vortex generator 302 may be configured to be retracted into the aircraft surface 106 such that the vortex generator leading edge 350 is flush with or submerged below the outer mold line 110. For example, FIGS. 17-18 illustrate the vortex generators 302 retracted such that the vortex generator leading edge 350 is substantially flush with the outer mold line 110 of the aircraft surface 106.

Movement of each vortex generator 302 between the stowed position 384 and deployed position 386 in FIGS. 15-18 may be effected by a vortex generator actuation mechanism 370 for pivoting each vortex generator 302 about a vortex generator retractability pivot axis 344. In the example shown, the vortex generator retractability pivot axis 344 of each vortex generator 302 is located proximate the vortex generator forward end 312. However, in an alternative configuration not shown, the vortex generator retractability pivot axis 344 may be located proximate the vortex generator aft end 314. In the example shown, the vortex generator actuation mechanism 370 includes an arcuate rack 380 extending from the vortex generator base portion 328 of the vortex generator 302. The vortex generator actuation mechanism 370 for each vortex generator 302 may further include a motor 374 (e.g., an electric motor) having a drive gear 376 engaged to the arcuate rack 380. Rotation of the drive gear 376 by the motor 374 causes pivoting of the vortex generator 302 about the vortex generator retractability pivot axis 344 to move the vortex generator 302 between the stowed position 384 and the deployed position 386. As an alternative to pivoting each vortex generator 302 between the stowed position 384 and deployed position 386, each vortex generator 302 may include a vortex generator actuation mechanism 370 configured to non-pivotably translate (not shown) the vortex generator 302 into and out of an opening or slot 124 formed in the aircraft surface 106. In any one of the examples disclosed herein, the vortex generator actuation mechanism 370 may comprise an electromechanical actuator, a hydraulic actuator, a pneumatic actuator, a shape memory alloy actuator, or other actuator configurations.

For aircraft 102 in which the cavity 112 has a cavity door (not shown), each one of the vortex generators 302 may be moved from the stowed position 384 to the deployed position 386 immediately prior to the opening of the cavity door and release of a store 200. After store separation, the vortex generators 302 may be moved back to the stowed position 384. For a cavity 112 that is already open or which lacks a cavity door, each one of the vortex generators 302 may be maintained in the stowed position 384 prior to release of the store to reduce exposure of the vortex generators 302 to the airflow 400, and thereby reduce aerodynamic drag that would otherwise be generated by the vortex generators 302 if constantly maintained in the deployed position 386.

Referring to FIGS. 19-22, shown are side views of non-limiting examples of vortex generators 302 having different shapes. Each one of the vortex generators 302 has a vortex generator leading edge 350 that is straight or curved. In addition, each one of the vortex generators 302 has a vortex generator trailing edge 351 at the vortex generator aft end 314. In the examples shown, the vortex generator trailing edge 351 is straight and is oriented locally substantially perpendicular to the outer mold line 110 when the vortex generator 302 is viewed from the side. However, in other examples not shown, the vortex generator trailing edge 351 may be non-straight and/or non-perpendicular to the outer mold line 110.

Figure 20:
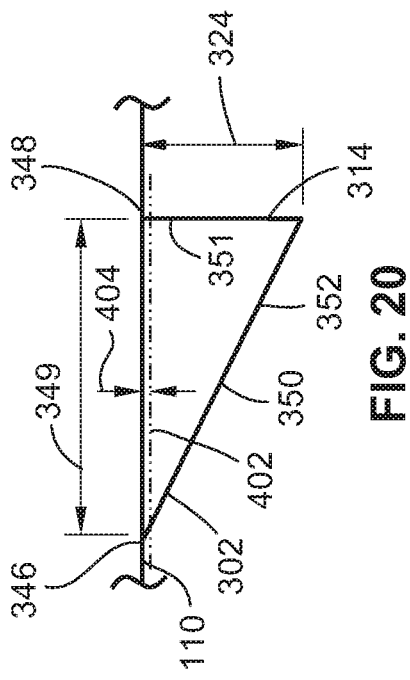
FIG. 20 is a side view of an example of a vortex generator having a triangular shape.
Figure 22:
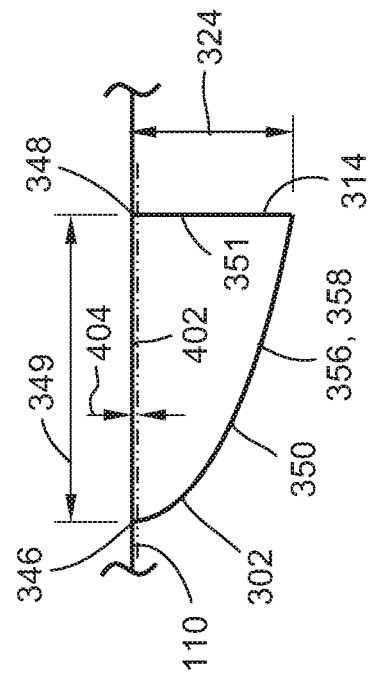
FIG. 22 is a side view of an example of a vortex generator having a curved shape, the curved shape comprising a convex shape.
Figure 19:
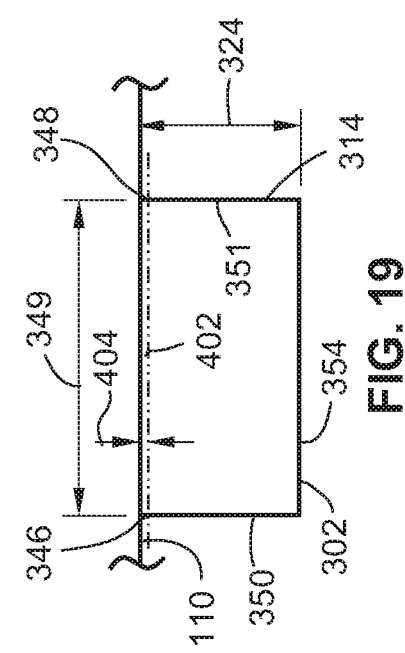
FIG. 19 is a side view of an example of a vortex generator having a rectangular shape.
Figure 21:
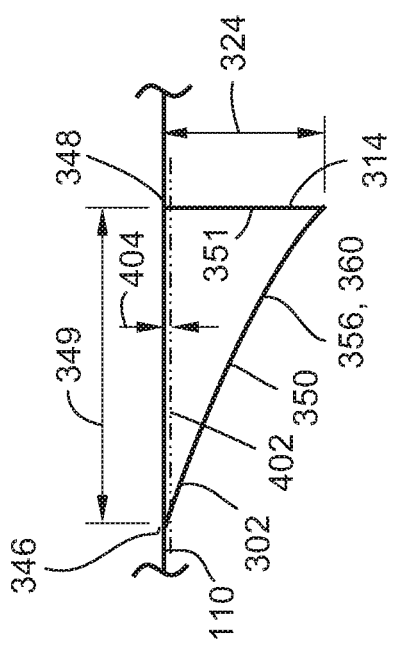
FIG. 21 is a side view of an example of a vortex generator in which the vortex generator leading edge has a curved shape, the curved shape comprising a concave shape.

FIG. 19 shows an example of a vortex generator 302 having a rectangular shape 354. However, the vortex generator 302 may be provided in an orthogonal shape other than a retainer shape, such as a square shape (not shown). FIG. 20 shows an example of a vortex generator 302 having a triangular shape 352. When viewed from the side, the vortex generator leading edge 350 defines an approximate 30 degree angle relative to the local outer mold line 110. However, the vortex generator leading edge 350 may be oriented at any angle relative to the outer mold line 110, and is not limited to the angle shown in FIG. 20. FIG. 21 shows an example of a vortex generator 302 in which the vortex generator leading edge 350 has a curved shape 356. In FIG. 21, the curved shape 356 is a concave shape 360. FIG. 22 shows an example of a vortex generator 302 in which the vortex generator leading edge 350 has a convex shape 358. For a vortex generator leading edge 350 having a concave shape 360 or a convex shape 358, the curved shape may be a quarter-elliptical shape, a quarter-parabolic shape or any one of a variety of other shapes.

In the examples of FIGS. 19-22, each vortex generator 302 has a vortex generator length 349 extending between the vortex generator forwardmost point 346 and the vortex generator aftmost point 348. In addition, each vortex generator 302 has a maximum vortex generator height 324 which may be defined as the furthest distance on the vortex generator 302 from the outer mold line 110 when the vortex generator is in the deployed position 386. In some examples, the maximum vortex generator height 324 may be equivalent to the length of the vortex generator trailing edge 351. The vortex generator length 349 may be in the range of 1.5-2.5 times the maximum vortex generator height 324. However, the vortex generator length 349 may be greater than 2.5 times the maximum vortex generator height 324. As mentioned above, the maximum vortex generator height 324 may be in the range of two (2) times the boundary layer thickness 404 of the boundary layer 402, to one-half of the cavity width 120 (FIG. 5). For the triangular shape 352 of the vortex generator 302 shown in FIG. 20, the vortex generator leading edge 350 may be oriented at an angle of approximately 30 degrees, resulting in the vortex generator length 349 being approximately 1.7 times the maximum vortex generator height 324. However, the vortex generator leading edge 350 may be oriented at any angle, and is not limited to an approximate 30 degree angle.

Referring briefly to FIG. 6, as mentioned above, each one of the vortex generators 302 has opposing vortex generator side surfaces 362 defining a vortex generator thickness 364. In some examples, the vortex generator thickness 364 may be between 0.050 and 0.25 inch. For example, the vortex generator thickness 364 may be approximately 0.10 inch. The vortex generator thickness 364 of each vortex generator 302 may be constant which may simplify manufacturing. However, it is contemplated that a vortex generator 302 may have a vortex generator thickness 364 that is variable along at least a portion of the vortex generator 302. For example, a vortex generator 302 may be slightly thinner at the vortex generator leading edge 350 (FIG. 7) than at the vortex generator trailing edge 351 (FIG. 7). The vortex generator thickness 364 may be dictated by strength or stiffness requirements and/or by thermal loading requirements. The vortex generators 302 be formed of a high-temperature material (e.g., metallic material, ceramic material, etc.). Each one of the vortex generators 302 may be planar. However, in other examples not shown, a vortex generator 302 may be slightly curved along at least one direction.

Referring to FIGS. 23-24, shown is a perspective view (FIG. 23) and a bottom view (FIG. 24) of a tandem arrangement 220 of stores 200 in a cavity 112. Each store 200 has a dedicated pair of vortex generators 302 mounted forward of the cavity leading edge 114 for assisting in the separation of the corresponding store 200 from the aircraft 102. Each pair of vortex generators 302 may be sized and configured as described above. For example, as shown in the above-described FIGS. 5-6, for each one of the stores 200, a pair of vortex generators 302 may be positioned laterally relative to the store 200 such that the store centerline 204 is coincident with a vertical plane 212 (FIG. 5) oriented parallel to the vehicle longitudinal axis 128 (e.g., aircraft longitudinal axis 104—FIG. 3). The vertical plane 212 passes through the vortex generator pair midpoint 320 (FIG. 6) between the pair of vortex generators 302. Each pair of vortex generators 302 generates counter-rotating vortices 406 (FIGS. 1-4) that interact to produce the above-mentioned streamwise flow field 408 (FIGS. 28, 30, 33) that generates a downwash of air 412 (FIGS. 28, 30, 33) away from the cavity 112. The downwash of air 412 generated by each pair of vortex generators 302 results in an aerodynamic downward force 414 (FIGS. 30-31 and 33-34) that urges the corresponding store 200 away from the aircraft 102 as the store 200 exits the cavity 112 after in-flight-release or ejection. In addition to generating the downward force 414 on the store 200, the streamwise flow field 408 produced by the counter-rotating vortices 406 of each pair of vortex generators 302 induces a downward pitching moment 418 (FIG. 34) on the corresponding store 200, and which may prevent the store 200 from pitching upwardly toward the aircraft 102 as the store 200 exits the cavity 112 and encounters the airflow 400 (FIG. 1) passing over the cavity 112.

Although the figures of the present disclosure show either a single store 200 (FIGS. 1-5) mounted in a cavity 112, or a tandem arrangement 220 of stores 200 (FIGS. 23-24) mounted in a cavity 112, the presently-disclosed vortex generator system 300 may be implemented for any one of a variety of alternative store arrangements (not shown), including an arrangement of two or more stores 200 in axial alignment with each other in forward-aft relation. In such axially aligned arrangement, a single pair of vortex generators 302 may be mounted forward of the cavity leading edge 114 for generating counter-rotating vortices 406 to facilitate the separation of both stores 200 from the aircraft 102. For example, a forward-aft arrangement of stores (not shown) may be sequentially released, wherein an aft store (not shown) may be initially released from the cavity 112, followed by the release of a forward store (not shown) from the cavity 112.

Referring to FIGS. 25-26, shown is a perspective view (FIG. 25) and bottom view (FIG. 26) of a portion of an aircraft 102 in which the vortex generator system 300 includes one or more additional smaller vortex generators 302 located adjacent to the pair of vortex generators 302. For example, the pair vortex generators 302 may include a third vortex generator 308 located proximate the first vortex generator 304, and/or a fourth vortex generator 310 located proximate the second vortex generator 306. The third vortex generator 308 is of a smaller size than the first vortex generator 304 and the second vortex generator 306, and may generate a vortex (not shown) of reduced strength relative to the strength of the vortex 406 (FIG. 1-2) generated by either the first vortex generator 304 or the second vortex generator 306. The fourth vortex generator 310 is also of a smaller size than the first vortex generator 304 and the second vortex generator 306. For example, the third and fourth vortex generators 308, 310 may be no more than 75 percent of the size respectively of the first and second vortex generators 304, 306.

Referring still to FIGS. 25-26, the third and fourth vortex generator 308, 310 may be located downstream respectively of the first and second vortex generator 304, 306. However, in other examples, the third and fourth vortex generator 308, 310 may be located upstream respectively of the first and second vortex generator 304, 306. In addition, the third and fourth vortex generator 308, 310 may be located in close proximity respectively to the first and second vortex generator 304, 306. For example, the third vortex generator 308 may be spaced apart from the first vortex generator 304 at a distance that is less than the distance of the maximum vortex generator height 324 of the first vortex generator 304. The third and fourth vortex generator 308, 310 may be sized and/or positioned relative to the first and second vortex generator 304, 306 so as have a relatively small (e.g., negligible) effect on the counter-rotating vortices 406 respectively generated by the first and second vortex generator 304, 306. Although FIGS. 25-26 show only a third and fourth vortex generator 308, 310 in addition to the first and second vortex generator 304, 306, a vortex generator system 300 may include additional vortex generators (e.g., a fifth vortex generator, a sixth vortex generator, etc.—not shown) located proximate the first and second vortex generators 304, 306.

Referring now to FIGS. 27-30 and 32-33, shown are the results of a computer simulation of a supersonic airflow 400 passing over a cavity 112 of an aircraft 102. FIGS. 27, 29 and 32 shown the results of a computer simulation of airflow 400 over a cavity of an aircraft in a prior art configuration lacking a vortex generator system 300. FIGS. 28, 30 and 33 show the results of a computer simulation of supersonic (e.g., Mach 2) airflow 400 passing over a cavity 112 of the same configuration as in FIGS. 27, 29 and 32, but which has the presently-disclosed vortex generator system 300 mounted forward of the cavity leading edge 114. In each of the above-mentioned figures, the results of the computer simulation are shown as a series of total pressure contour plots 410 at uniformly spaced intervals along the streamwise direction of the airflow 400. Each total pressure contour plot 410 shows the total pressure at the location of the plot, and which is a combination of thermodynamic pressure and kinetic energy at the location of the plot. For the prior art configuration of FIG. 27, the series of total pressure contour plots 410 show that the passage of airflow 400 over the cavity 112 results in a relatively weak flow field along the cavity length 118.

In contrast, FIG. 28 shows the results of the computer simulation of supersonic airflow 400 passing over and through a pair of vortex generators 302 mounted upstream of a cavity 112 of the same configuration as in FIG. 27. The series of total pressure contour plots 410 in FIG. 28 show a strongly-developed three-dimensional streamwise flow field 408 as a result of the counter-rotating vortices 406 (FIGS. 1-4) generated by the pair of vortex generators 302. As described above, the strongly-developed three-dimensional streamwise flow field 408 results in an increase in a downwash of air 412 away from the cavity 112.

FIGS. 29-30 shows the results of the computer simulation of supersonic airflow 400 on a store 200 exiting the cavity 112 of FIGS. 27-28 after release or ejection from a store mounting system 214 (FIGS. 3-4), and passing through the cavity shear layer 122 (FIG. 31). For the prior art configuration of FIG. 29, the series of total pressure contour plots 410 show a relatively weak flow field which result in a modest downward force 414 on the store 200. However, as also shown in FIG. 29, the flow field may generate a relatively strong upward pitching moment 420 about the store center of gravity 202 (FIGS. 31, 34), and which may undesirably urge the store forward portion 206 toward the aircraft 102 as the store 200 exits the cavity 112.

In contrast, FIGS. 30-31 show the beneficial effects of the counter-rotating vortices 406 (FIGS. 1-4) generated by the pair of vortex generators 302 in developing the three-dimensional streamwise flow field 408. More specifically, the counter-rotating vortices 406 pull in air from outside of the vortices 406 (FIGS. 1-4 and 31) as mentioned above, and pinch 413 the air immediately outside of the cavity shear layer 122 (FIG. 31). The pinching of the air by the counter-rotating vortices 406 generates a relatively strong downward force 414 on the store 200. In addition, the counter-rotating vortices 406 reduce the magnitude of the upward pitching moment 420 relative to the pitching moment generated by the prior art configuration of FIG. 29 at the point where the store 200 is passing through the cavity shear layer 122 as shown in FIG. 31. The reduced upward pitching moment 420 about the store center of gravity 202 (FIGS. 31, 34) reduces the risk of the store 200 contacting the aircraft 102 during store separation.

Figure 34:
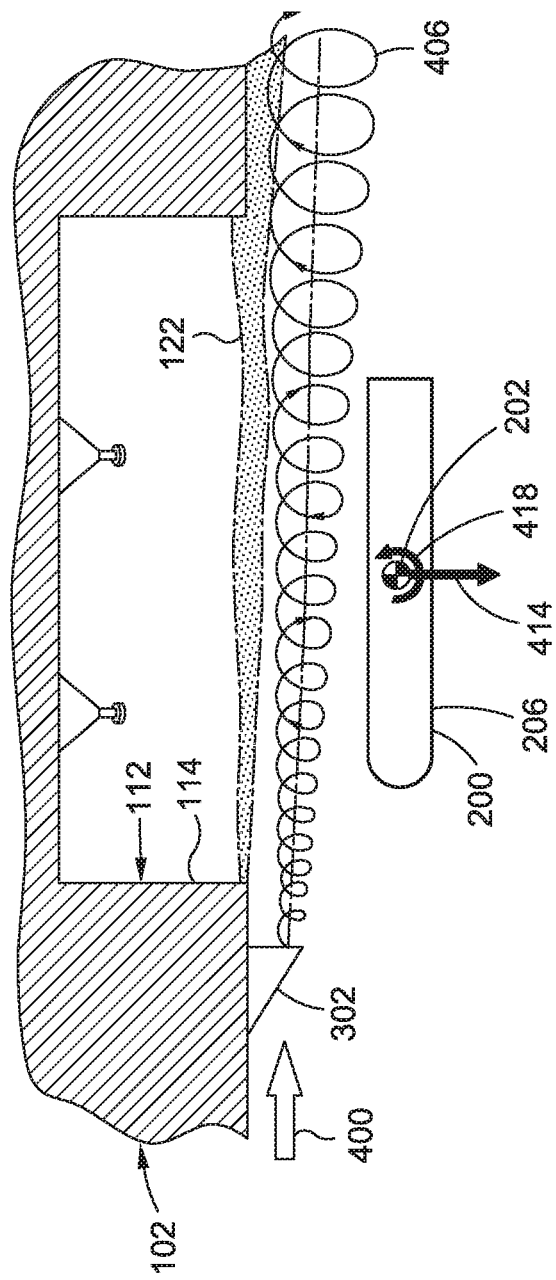
FIG. 34 is a longitudinal sectional view of the aircraft of FIGS. 32-33 showing the position of the store relative to the cavity shear layer.

FIGS. 32-33 show the results of the computer simulation of the supersonic airflow 400 over the cavity 112 when the store 200 is further away from the cavity shear layer 122 than in FIGS. 29-31. For the prior art configuration of FIG. 32, the relatively weak flow field as represented by the series of total pressure contour plots 410 results in a downward pitching moment 418 on the store forward portion about the store center of gravity 202 (FIGS. 31, 34). However, the airflow 400 undesirably results in an upward force 416 on the store 200 which tends to urge the store 200 toward the aircraft 102 as a store exits the cavity 112.

In contrast, FIGS. 33-34 show the beneficial effects of the three-dimensional streamwise flow field 408 resulting from the counter-rotating vortices 406 (FIGS. 1-4) generated by the pair of vortex generators 302. More specifically, the three-dimensional streamwise flow field 408 results in a downward force 414 of increased magnitude on the store 200 relative to the downward force 414 shown in the prior art configuration of FIG. 32. The increased downward force 414 shown in FIG. 33 is advantageously more effective in urging the store 200 away from the aircraft 102. In addition, the three-dimensional streamwise flow field 408 shown in FIG. 33 results in a downward pitching moment 418 about the store center of gravity 202 (FIGS. 31, 34), and which advantageously urges the store forward portion 206 away from the aircraft 102. As can be seen by the results of the computer simulation illustrated in FIGS. 28, 30 and 33, the pair of vortex generators 302 significantly improve the dynamics of store separation from the aircraft 102 by conditioning the airflow 400 in a manner that urges the store 200 away from the aircraft 102 and prevents upward pitching of the store 200 as the store 200 exits the cavity 112.

Figure 35:
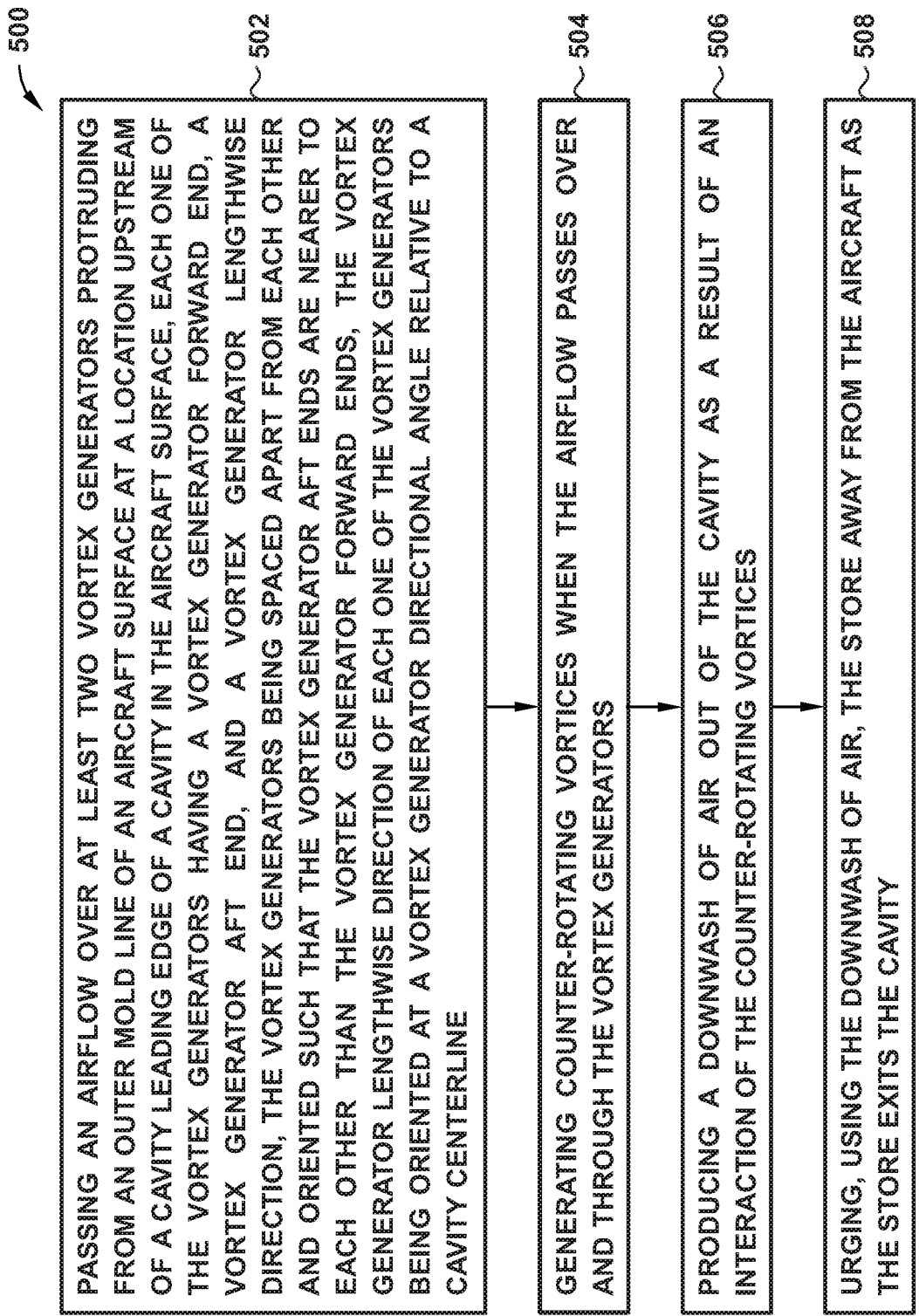
FIG. 35 is a flowchart of operations included in a method of assisting in the separation of a store from an aircraft.

Referring to FIG. 35, shown is a flowchart of operations included in method 500 of assisting in the separation of a store 200 from an aircraft 102. Step 502 of the method 500 includes passing an airflow 400 (FIGS. 1-2) over two or more (e.g., a pair of) vortex generators 302 protruding from an outer mold line 110 of an aircraft surface 106 at a location upstream of a cavity leading edge 114 of a cavity 112 in the aircraft surface 106. As shown in the figures and described above, each one of the vortex generators 302 has a vortex generator forward end 312, a vortex generator aft end 314, and a vortex generator lengthwise direction 338. The pair of vortex generators 302 are spaced apart from each other and oriented such that the vortex generator aft ends 314 are nearer to each other than the vortex generator forward ends 312 as shown in FIG. 6. In addition, the vortex generator lengthwise direction 338 of each vortex generator 302 is oriented at a vortex generator directional angle 340 (FIG. 6) relative to the direction of the airflow 400 passing over and/or through the vortex generators 302.

As mentioned above, the vortex generator directional angle 340 of each one of the vortex generators 302 may be set to a predetermined value during installation or mounting of the vortex generator system 300 on the aircraft 102. In one example, the vortex generator directional angle 340 of each one of vortex generators 302 may be in the range of 10-75 degrees and, more preferably, in the range of 25-55 degrees relative to the direction of the airflow 400. For purposes of defining the vortex generator directional angle 340, in the present disclosure, the direction of the airflow 400 may be described as being parallel to a direction of the free stream flow in front of the aircraft 102. The direction of the freestream flow may be described as the direction of the airflow prior to deflection by the oncoming aircraft.

Step 504 of the method 500 includes generating, respectively via the vortex generators 302, counter-rotating vortices 406 when the airflow 400 passes over and through the vortex generators 302. For example, FIGS. 1-4 illustrate counter-rotating vortices 406 generated by the vortex generators 302. As described above, the vortex generators 302 are sized, configured, and oriented in a manner such that the counter-rotating vortices 406 pull in air from outside of the vortices 406, and pinch 413 the air immediately outside of the cavity shear layer 122, as shown in the total pressure contour plots 410 of FIGS. 28, 30 and 33.

Step 506 of the method 500 includes producing a downwash of air 412 away from the cavity 112 as a result of the interaction of the counter-rotating vortices 406. For example, FIGS. 30-31 and 33-34 illustrate a downward force 414 imposed on the store 200 resulting from the downwash of air 412 generated by the counter-rotating vortices 406. In addition, the downwash of air 412 away from the cavity 112 results in a downward pitching moment 418 about the store center of gravity 202 (FIGS. 31, 34) of the store 200 as the store 200 moves away from the cavity shear layer 122 as shown in FIGS. 33-34.

Step 508 of the method 500 includes urging, using the downwash of air 412, the store 200 away from the aircraft 102. As described above, the downward force 414 resulting from the downwash of air 412 urges the store 200 away from the aircraft 102 as the store 200 exits the cavity 112. In addition, the downwash of air 412 pivots the store forward portion 206 away from the aircraft 102 and thereby prevents contact of the store 200 with the aircraft 102.

Referring to FIGS. 8-10 as described above, the method 500 may include adjusting the vortex generator directional angle 340 of one or both of the vortex generators 302 by pivoting each one of the vortex generators 302 about a vortex generator directionality pivot axis 342 oriented locally substantially perpendicular to the outer mold line 110. The pivoting of each vortex generator 302 may be performed on the ground and/or in flight, and may be facilitated by a vortex generator directional adjustment mechanism 372 which may include a motor 374 as described above. The method may include altering the strength of the counter-rotating vortices 406 as a result of adjusting the vortex generator directional angle 340.

The adjustment of the vortex generator directional angle 340 of a vortex generator 302 may be performed based on at least one aircraft parameter and/or based on at least one store parameter. Aircraft parameters that may be used as the basis for adjusting a vortex generator directional angle 340 may include airspeed, altitude, ambient air pressure, ambient air temperature, and aircraft angle of attack and/or other parameters. Store parameters that may be used as the basis for adjusting the vortex generator directional angle 340 may include the store shape, store size, and store mass. The vortex generator directional angle 340 may be adjusted based on any one or more of a combination of aircraft parameters and/or store parameters.

Referring briefly to FIGS. 11-18, the method may optionally include moving each one of the vortex generators 302 between a stowed position 384 and a deployed position 386. Movement of a vortex generator 302 between the stowed position 384 and deployed position 386 may be effectuated by a vortex generator actuation mechanism 370 as described above. For example, the vortex generator actuation mechanism 370 may include a motor 374 having a drive gear 376 that may be engaged to a pinion gear 378 (FIG. 14) or to an arcuate rack 380 (FIGS. 16 and 18) extending from the vortex generator 302. In the stowed position 384, each one of the vortex generators 302 may be non-protruding from a boundary layer thickness 404 of the airflow 400 passing over the aircraft surface 106. For example, each one of the vortex generators in the stowed position 384 may be submerged below the aircraft surface 106. In the deployed position 386, each one of the vortex generators 302 may protrude beyond the boundary layer thickness 404.

In the example of FIGS. 11-14, each one of the vortex generators 302 may be pivoted about a vortex generator hinge line 330 for moving the vortex generator 302 between the stowed position 384 and the deployed position 386 as shown in FIG. 14. As shown in FIGS. 12-14, the aircraft surface 106 may include a recess 108 sized to receive a vortex generator 302 in the stowed position 384 in a manner such that the vortex generator 302 is non-protruding above the outer mold line 110 of the aircraft surface 106, thereby reducing aerodynamic drag otherwise generated if the vortex generators 302 are folded against the aircraft surface 106.

As an alternative to or in addition to moving the vortex generators 302 between a stowed position 384 and a deployed position 386, the method 500 may also include adjusting the vortex generator standoff angle 326 of each vortex generator 302 relative to the outer mold line 110. For example, as shown in the above-described FIGS. 11-14, the method 500 may include pivoting each one of the vortex generators 302 about a vortex generator hinge line 330 extending along the vortex generator lengthwise direction 338 and located proximate the vortex generator base portion 328. Adjustment of the vortex generator standoff angle 326 may be performed on the ground and/or in flight. Adjustment of the vortex generator standoff angle 326 may be based upon the above-described aircraft parameters and/or store parameters.

In the example of FIGS. 15-18, shown is an alternative arrangement for moving the vortex generators between the stowed position 384 and the deployed position 386. Each one of the vortex generators 302 may be moved into and out of a slot 124 formed in an aircraft surface 106. The vortex generators 302 may be moved along a direction parallel to the vortex generator side surfaces 362 when moving between the stowed position 384 and deployed position 386. As mentioned above, when a vortex generator 302 is in the stowed position 384, the vortex generator leading edge 350 portion may be non-protruding from boundary layer 402. When a vortex generator 302 is in the deployed position 386, the vortex generator leading edge 350 may protrude beyond the boundary layer 402. For example, FIGS. 15-18 illustrates a vortex generator retractability pivot axis 344 about which each vortex generator 302 may be pivoted between the stowed position 384 and deployed position 386, as described above. However, in other examples not shown, movement of a vortex generator 302 between the stowed position 384 and the deployed position 386 may be performed by translating the vortex generator 302 along a direction parallel to the vortex generator side surfaces 362. The movement of a vortex generator 302 between the stowed position 384 and the deployed position 386 may be performed using at least one vortex generator actuation mechanism 370 as described above, and which may include an electromechanical actuator, a hydraulic actuator, a pneumatic actuator, a shape memory alloy actuator, a magnetic actuator, or any one of a variety of other actuator mechanisms.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A vortex generator system for assisting in a separation of a store from a vehicle, comprising:
   at least two vortex generators protrudable from an outer mold line of a vehicle surface at a location upstream of a cavity leading edge of a cavity in the vehicle surface, each one of the vortex generators having a vortex generator forward end, a vortex generator aft end, and a vortex generator lengthwise direction;
   the at least two vortex generators being spaced apart from each other and oriented such that the vortex generator aft ends are nearer to each other than the vortex generator forward ends, the vortex generator lengthwise direction of each one of the vortex generators being oriented at a vortex generator directional angle relative to a direction of an airflow; and
   the at least two vortex generators configured to generate a pair of counter-rotating vortices when the airflow passes through or over the vortex generators, the pair of counter-rotating vortices interacting to produce a downwash of air away from the cavity that urges the store away from the vehicle as the store exits the cavity.

2. The vortex generator system of claim 1, wherein:
   each one of the vortex generators is configured to be pivotable about a vortex generator directionality pivot axis oriented locally perpendicular to the outer mold line for adjusting the vortex generator directional angle to thereby change a strength of the counter-rotating vortices generated by the at least two vortex generators.

3. The vortex generator system of claim 1, wherein:
   the store has a store centerline;
   each one of the vortex generators has a vortex generator leading edge and vortex generator forwardmost point where the vortex generator leading edge intersects the outer mold line;
   the at least two vortex generators defining a vortex generator pair midpoint on the outer mold line midway between the vortex generator forwardmost points respectively of the vortex generator forward ends; and the at least two vortex generators being positioned laterally relative to the store such that the store centerline is coincident with a vertical plane oriented parallel to a vehicle longitudinal axis and passing through the vortex generator pair midpoint.

4. The vortex generator system of claim 1, wherein:
the cavity has a cavity trailing edge and a cavity length extending between the cavity leading edge and the cavity trailing edge; and
each one of the vortex generators is located such that a vortex generator aftmost point on the vortex generator aft end is located forward of the cavity leading edge by a distance of less than one-half the cavity length.

5. The vortex generator system of claim 1, wherein:
each one of the vortex generators has a vortex generator forwardmost point; and
the at least two vortex generators are located such that vortex generator forwardmost points are separated by a lateral distance of between 10 to 75 percent of a cavity width of the cavity.

6. The vortex generator system of claim 1, wherein:
each one of the vortex generators has a maximum vortex generator height above the outer mold line in a range of two times a boundary layer thickness to one-half of a cavity width of the cavity.

7. The vortex generator system of claim 1, wherein:
each one of the vortex generators has a vortex generator base portion and opposing vortex generator side surfaces defining a vortex generator standoff angle relative to the outer mold line; and
each one of the vortex generators is pivotable about a vortex generator hinge line extending along the vortex generator lengthwise direction and located proximate the vortex generator base portion for adjusting the vortex generator standoff angle relative to the outer mold line.

8. The vortex generator system of claim 1, wherein:
each one of the vortex generators is movable between a stowed position and a deployed position;
each one of the vortex generators in the stowed position being non-protruding from a boundary layer of the airflow passing over the outer mold line; and
each one of the vortex generators in the deployed position protruding beyond the boundary layer.

9. The vortex generator system of claim 8, wherein:
each one of the vortex generators has opposing vortex generator side surfaces and a vortex generator base portion located proximate the outer mold line;
each one of the vortex generators is pivotable about a vortex generator hinge line extending along the vortex generator lengthwise direction and located proximate the vortex generator base portion for pivoting the vortex generator between the stowed position and the deployed position;
each one of the vortex generators in the stowed position being oriented such that the vortex generator side surfaces are generally locally parallel to the outer mold line and one of the vortex generator side surfaces is positioned against the outer mold line; and
each one of the vortex generators in the deployed position being oriented such that the vortex generator side surfaces are locally perpendicular to the outer mold line.

10. The vortex generator system of claim 8, wherein:
each one of the vortex generators has a vortex generator leading edge, opposing vortex generator side surfaces, and a maximum vortex generator height above the outer mold line; and
each one of the vortex generators is movable along a direction parallel to a plane of the vortex generator side surfaces for moving the vortex generator between the stowed position in which the vortex generator leading edge is retracted into the vehicle surface such that the vortex generator leading edge is flush with or submerged below the outer mold line, and the deployed position in which the vortex generator leading edge protrudes beyond the boundary layer to the maximum vortex generator height.

11. An aircraft, comprising:
a cavity in an aircraft surface having an outer mold line, the cavity configured to contain at least one store and having a cavity leading edge;
a pair of vortex generators protrudable from the outer mold line at a location upstream of the cavity leading edge, each one of the vortex generators having a vortex generator forward end, a vortex generator aft end, and a vortex generator lengthwise direction;
the pair of vortex generators being spaced apart from each other and oriented such that the vortex generator aft ends are nearer to each other than the vortex generator forward ends, the vortex generator lengthwise direction of each one of the vortex generators being oriented at a vortex generator directional angle relative to a direction of an airflow;
the pair of vortex generators configured to generate a pair of counter-rotating vortices when the airflow passes through or over the vortex generators, the pair of counter-rotating vortices interacting to produce a downwash of air away from the cavity that urges the store away from the aircraft as the store exits the cavity; and
wherein at least one of the vortex generators includes a vortex generator directional adjustment mechanism configured to pivot the vortex generator about a vortex generator directionality pivot axis oriented locally perpendicular to the outer mold line for adjusting the vortex generator directional angle to thereby adjust a strength of the pair of counter-rotating vortices.

12. The aircraft of claim 11, wherein:
the vortex generator directional adjustment mechanism is configured to be adjustable based on at least one of one or more aircraft parameters and one or more store parameters;
the aircraft parameters including airspeed, altitude, ambient air pressure, ambient air temperature, and aircraft angle of attack; and
the store parameters including store shape, store size, store mass, and store center of gravity.

13. A method for assisting in a separation of a store from a vehicle, comprising:
passing an airflow over at least two vortex generators protruding from an outer mold line of a vehicle surface at a location upstream of a cavity leading edge of a cavity in the vehicle surface, each one of the vortex generators having a vortex generator forward end, a vortex generator aft end, and a vortex generator lengthwise direction, the vortex generators being spaced apart from each other and oriented such that the vortex generator aft ends are nearer to each other than the vortex generator forward ends, the vortex generator lengthwise direction of each one of the vortex generators being oriented at a vortex generator directional angle relative to a direction of the airflow;

generating, respectively via the at least two vortex generators, counter-rotating vortices when the airflow passes through or over the vortex generators;

producing a downwash of air away from the cavity as a result of the counter-rotating vortices; and urging, using the downwash of air, the store away from the vehicle as the store exits the cavity.

14. The method of claim 13, wherein:

the vortex generator directional angle of each one of the vortex generators is between 10 and 45 degrees relative to the direction of the airflow.

15. The method of claim 13, further comprising:

adjusting the vortex generator directional angle by pivoting each one of the vortex generators about a vortex generator directionality pivot axis oriented locally perpendicular to the outer mold line; and altering a strength of the counter-rotating vortices as a result of adjusting the vortex generator directional angle.

16. The method of claim 15, wherein adjusting the vortex generator directional angle further comprises:

adjusting the vortex generator directional angle based on at least one aircraft parameter and based on at least one store parameter;

the at least one aircraft parameter including airspeed, altitude, ambient air pressure, ambient air temperature, and aircraft angle of attack; and the at least one store parameter including store shape, store size, store mass, and store center of gravity.

17. The method of claim 13, further comprising:

adjusting a vortex generator standoff angle of at least one of the vortex generators by pivoting the vortex generator about a vortex generator hinge line.

18. The method of claim 13, further comprising:

moving each one of the vortex generators between a stowed position and a deployed position; and wherein each one of the vortex generators in the stowed position being non-protruding from a boundary layer of the airflow passing over the vehicle surface, and each one of the vortex generators in the deployed position protruding beyond the boundary layer.

19. The method of claim 18, wherein moving each one of the vortex generators between the stowed position and the deployed position comprises:

pivoting each one of the vortex generators about a vortex generator hinge line extending along the vortex generator lengthwise direction and located proximate a vortex generator base portion.

20. The method of claim 18, wherein moving each one of the vortex generators between the stowed position and the deployed position comprises:

moving each one of the vortex generators into and out of the vehicle surface along a direction parallel to a vortex generator side surface respectively of the vortex generator.

\* \* \* \* \*